(12) United States Patent
Maruyama et al.

(10) Patent No.: US 10,656,372 B2
(45) Date of Patent: May 19, 2020

(54) IMAGING LENS AND IMAGING APPARATUS

(71) Applicant: Sony Corporation, Tokyo (JP)

(72) Inventors: Masaki Maruyama, Chiba (JP); Hiroyuki Matsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 58 days.

(21) Appl. No.: 16/063,848

(22) PCT Filed: Dec. 5, 2016

(86) PCT No.: PCT/JP2016/086059
§ 371 (c)(1),
(2) Date: Jun. 19, 2018

(87) PCT Pub. No.: WO2017/130571
PCT Pub. Date: Aug. 3, 2017

(65) Prior Publication Data
US 2018/0372986 A1 Dec. 27, 2018

(30) Foreign Application Priority Data

Jan. 26, 2016 (JP) .................................. 2016-012401

(51) Int. Cl.
*G02B 7/04* (2006.01)
*G02B 9/64* (2006.01)
(Continued)

(52) U.S. Cl.
CPC .................. *G02B 7/04* (2013.01); *G02B 7/14* (2013.01); *G02B 9/12* (2013.01); *G02B 9/64* (2013.01); *G02B 27/0037* (2013.01)

(58) Field of Classification Search
CPC ........ G02B 7/102; G02B 7/10; G02B 13/009; G02B 15/14; G03B 3/10
(Continued)

(56) References Cited

U.S. PATENT DOCUMENTS

2006/0238891 A1* 10/2006 Ogata .................. G02B 15/173
359/690
2014/0139931 A1* 5/2014 Kubota ..................... G02B 9/62
359/689
2016/0356985 A1* 12/2016 Sun .......................... G02B 9/64

FOREIGN PATENT DOCUMENTS

JP 03-141313 6/1991
JP 07-152001 6/1995
(Continued)

*Primary Examiner* — Mohammed A Hasan
(74) *Attorney, Agent, or Firm* — Michael Best & Friedrich LLP

(57) ABSTRACT

An imaging lens and imaging apparatus are disclosed. In one example, an imaging lens includes a first lens group having positive refractive power, a second lens group having a positive refractive power, and a third lens group having positive or negative refractive power, the first lens group being fixed with respect to an image plane, the second lens group traveling along an optical axis to the object side, and the third lens group being fixed with respect to the image plane. The first lens group may include two positive lenses and a negative lens. The second lens group may include a second a-lens component having negative refractive power and a second b-lens component having positive refractive power. The third lens group may include a third a-lens component having positive refractive power and a third b-lens component having negative refractive power.

20 Claims, 10 Drawing Sheets

(51) Int. Cl.
    *G02B 7/14* (2006.01)
    *G02B 9/12* (2006.01)
    *G02B 27/00* (2006.01)
(58) Field of Classification Search
    USPC .......................................................... 359/694
    See application file for complete search history.

(56) References Cited

FOREIGN PATENT DOCUMENTS

| | | | |
|---|---|---|---|
| JP | 2002-098894 | A | 4/2002 |
| JP | 2009-244699 | A | 10/2009 |
| JP | 2011-128273 | A | 6/2011 |
| JP | 2013-025175 | A | 2/2013 |
| JP | 2013-218015 | A | 10/2013 |

* cited by examiner

[ FIG. 1 ]
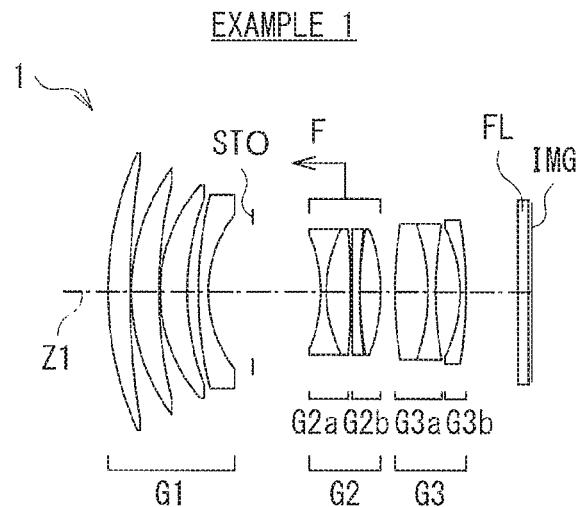
[ FIG. 2 ]
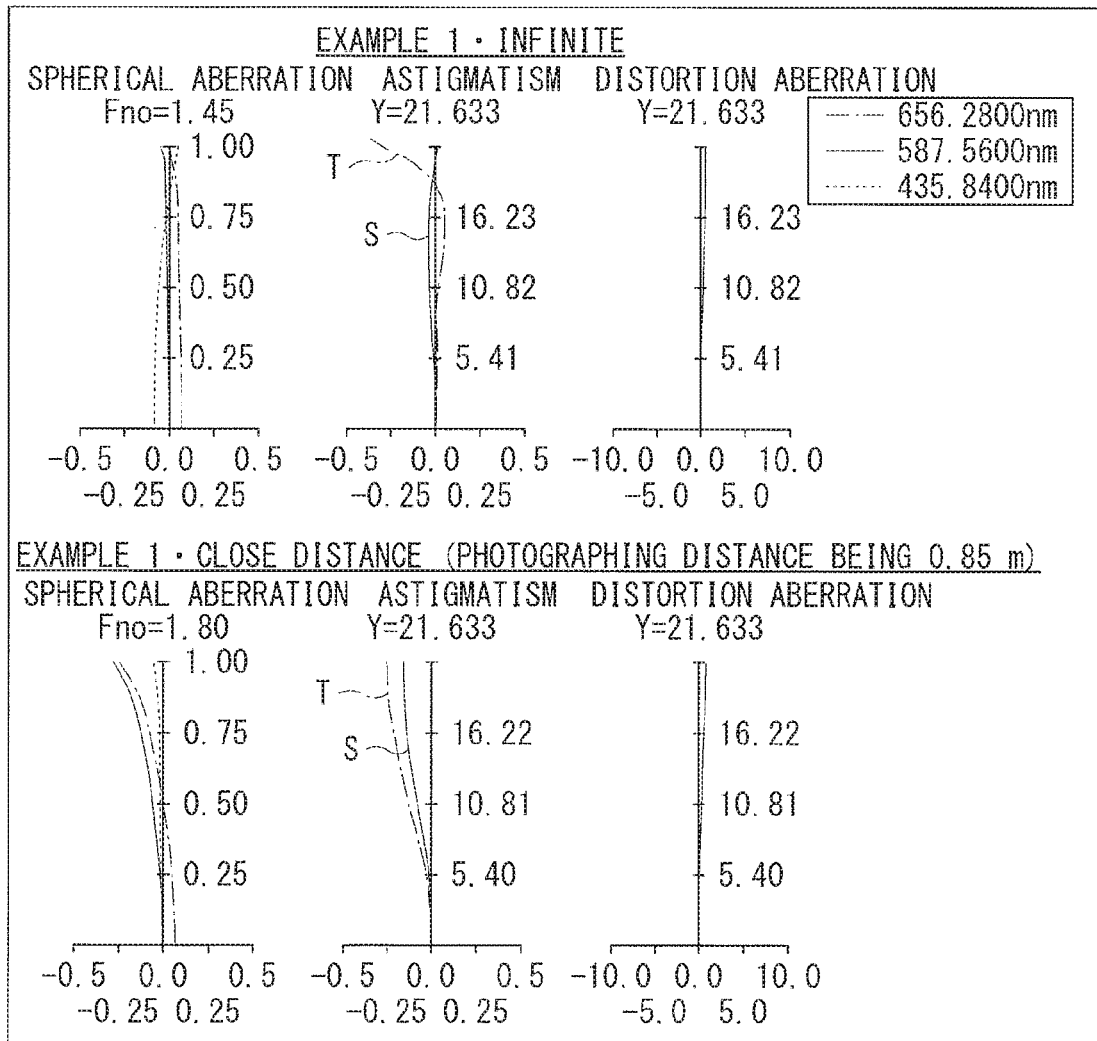

[FIG. 3]
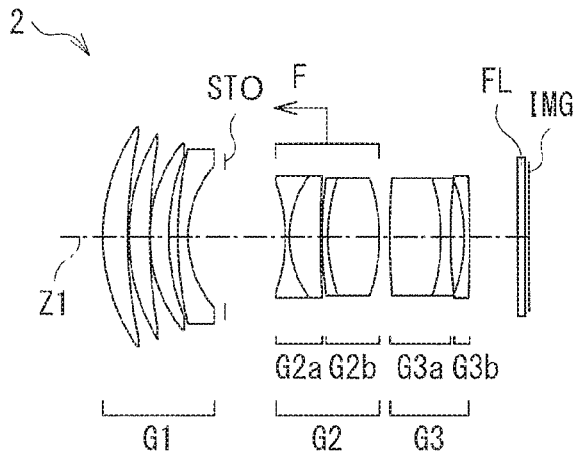
[FIG. 4]
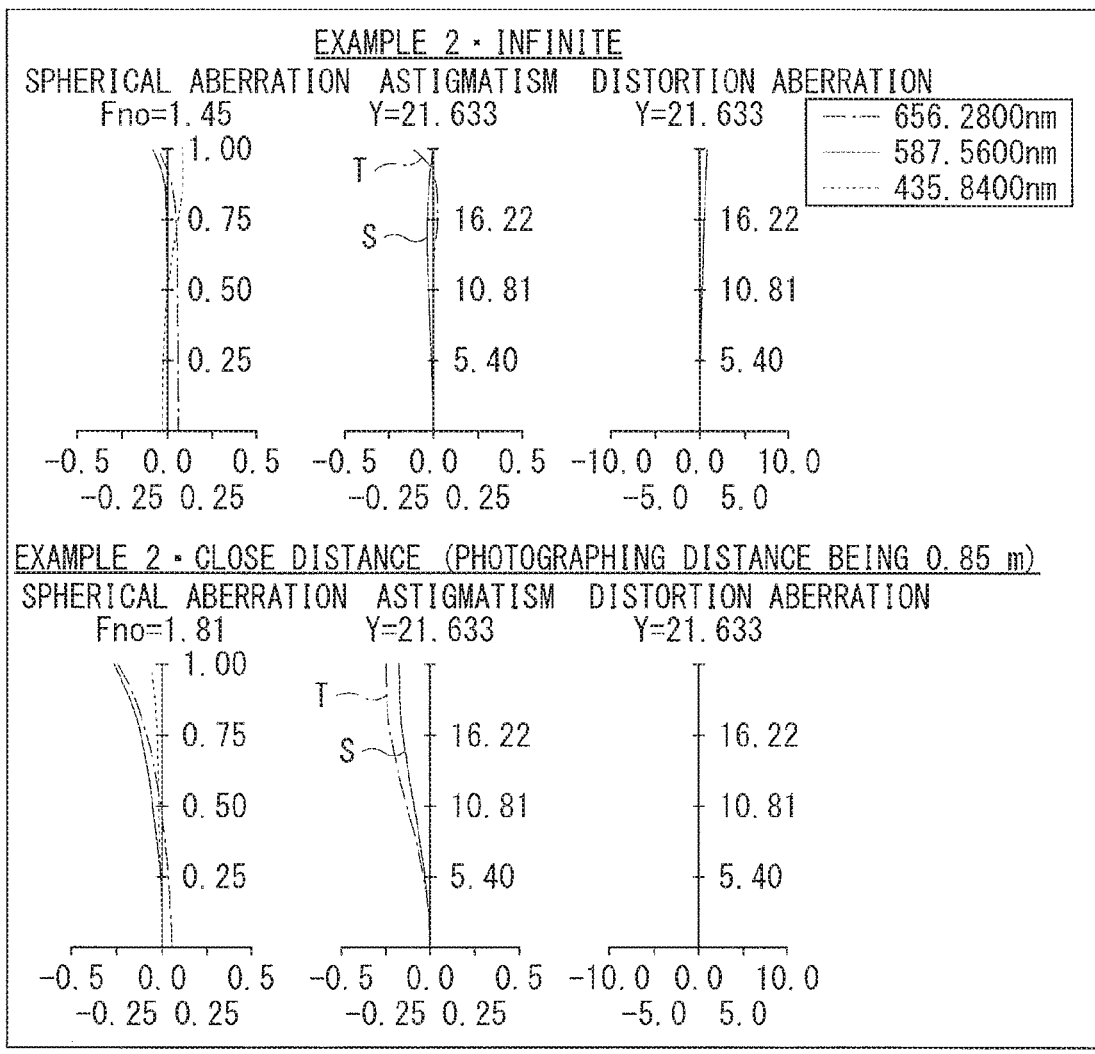

[FIG. 5]
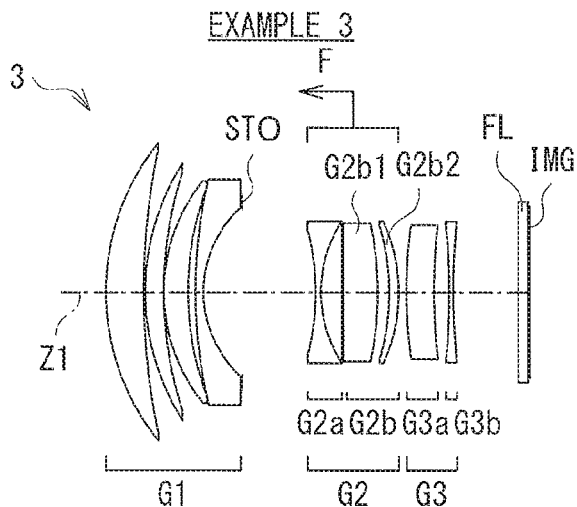
[FIG. 6]
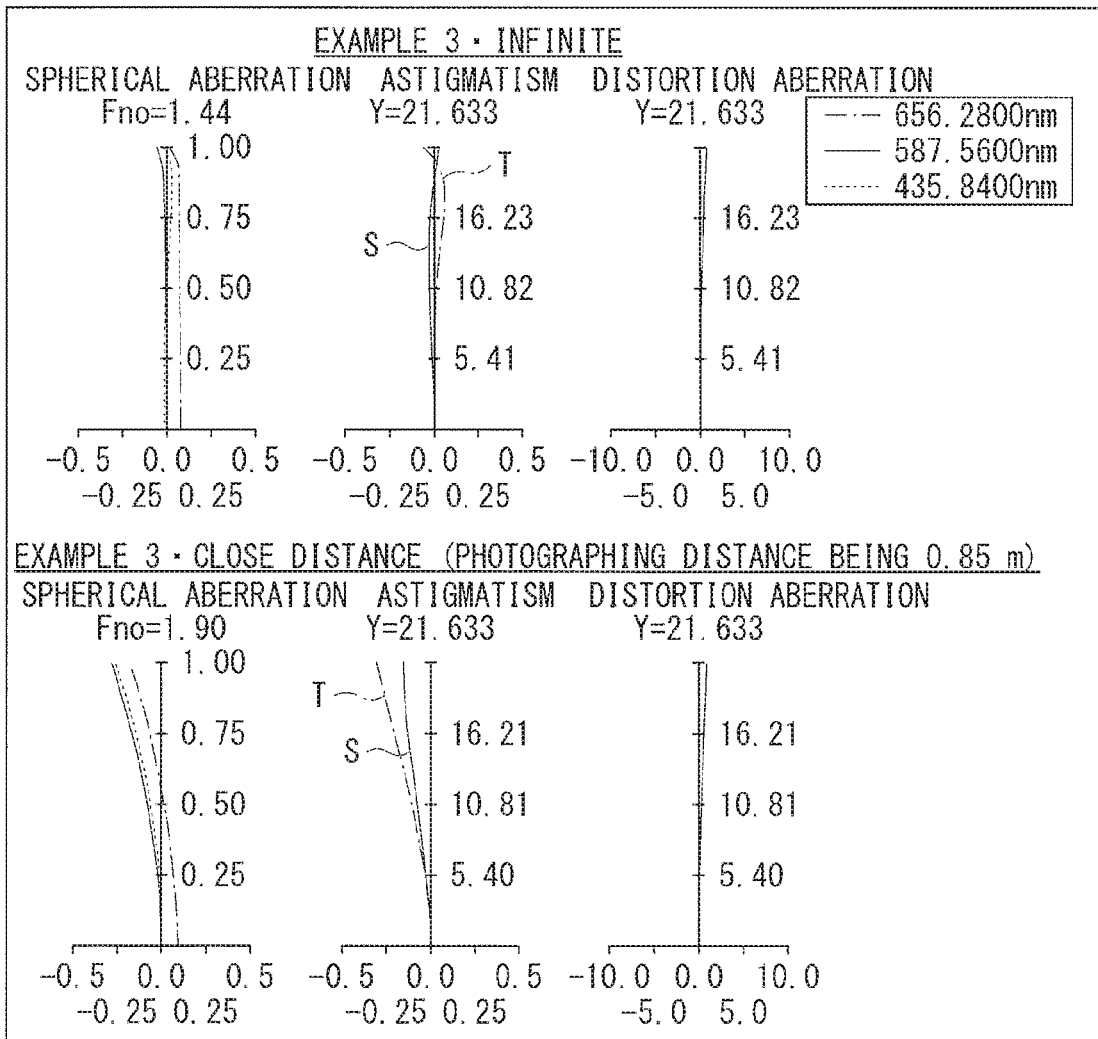

[FIG. 7]
EXAMPLE 4
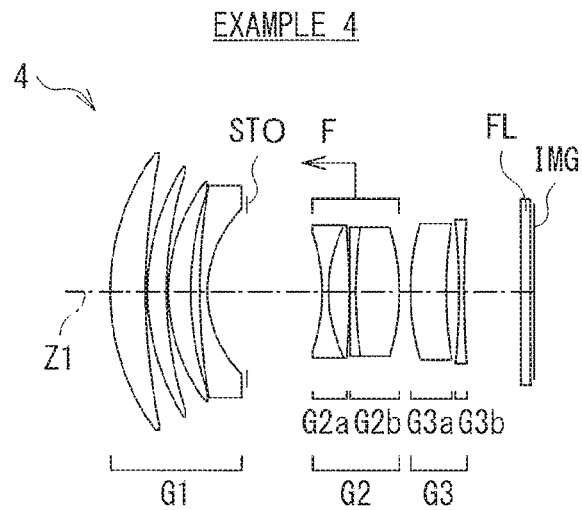
[FIG. 8]
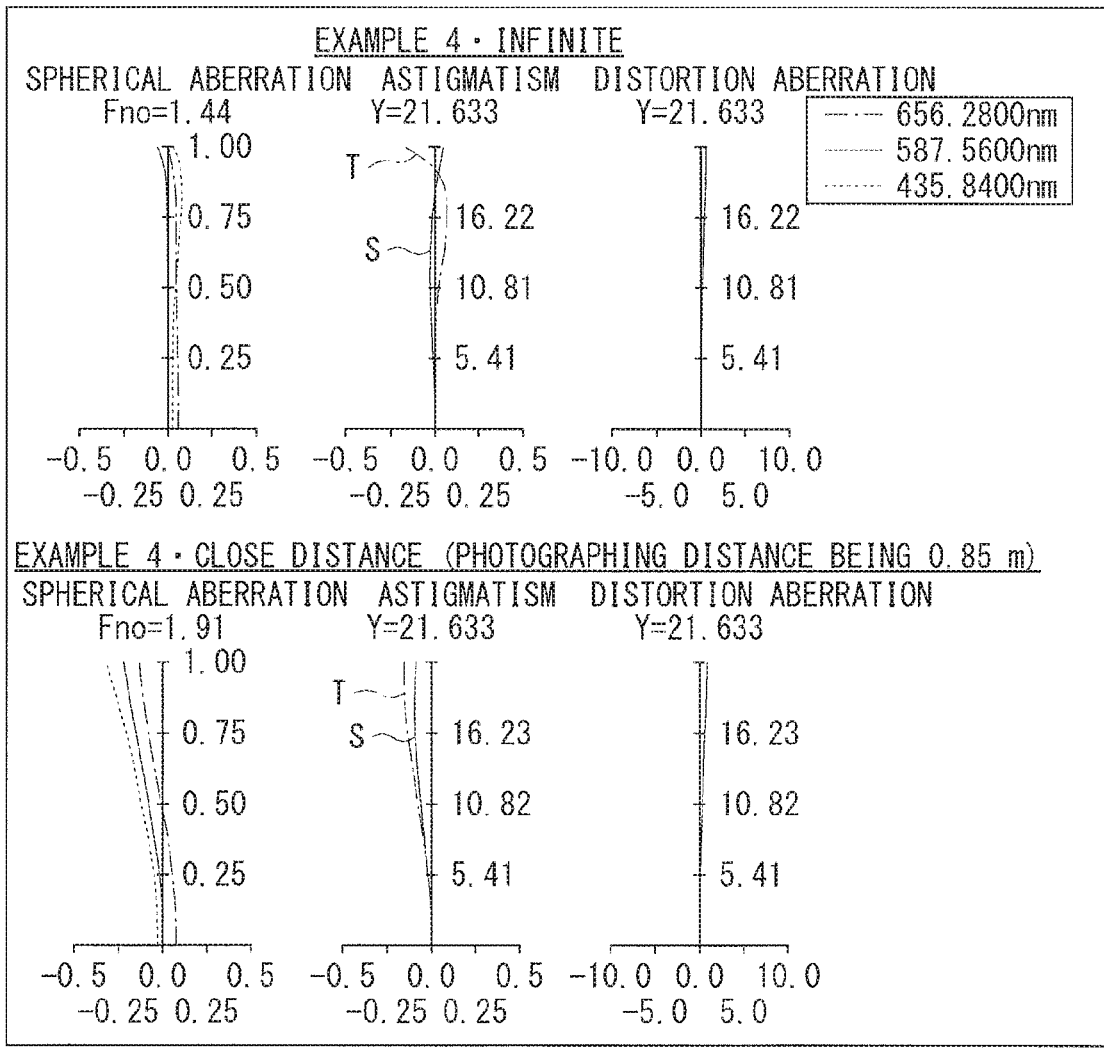

[ FIG. 9 ]
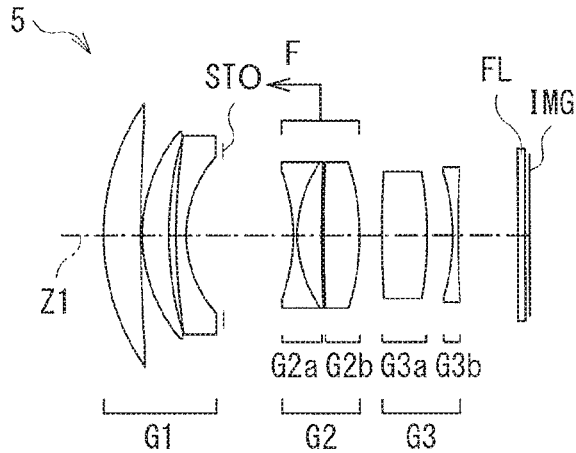
[ FIG. 10 ]
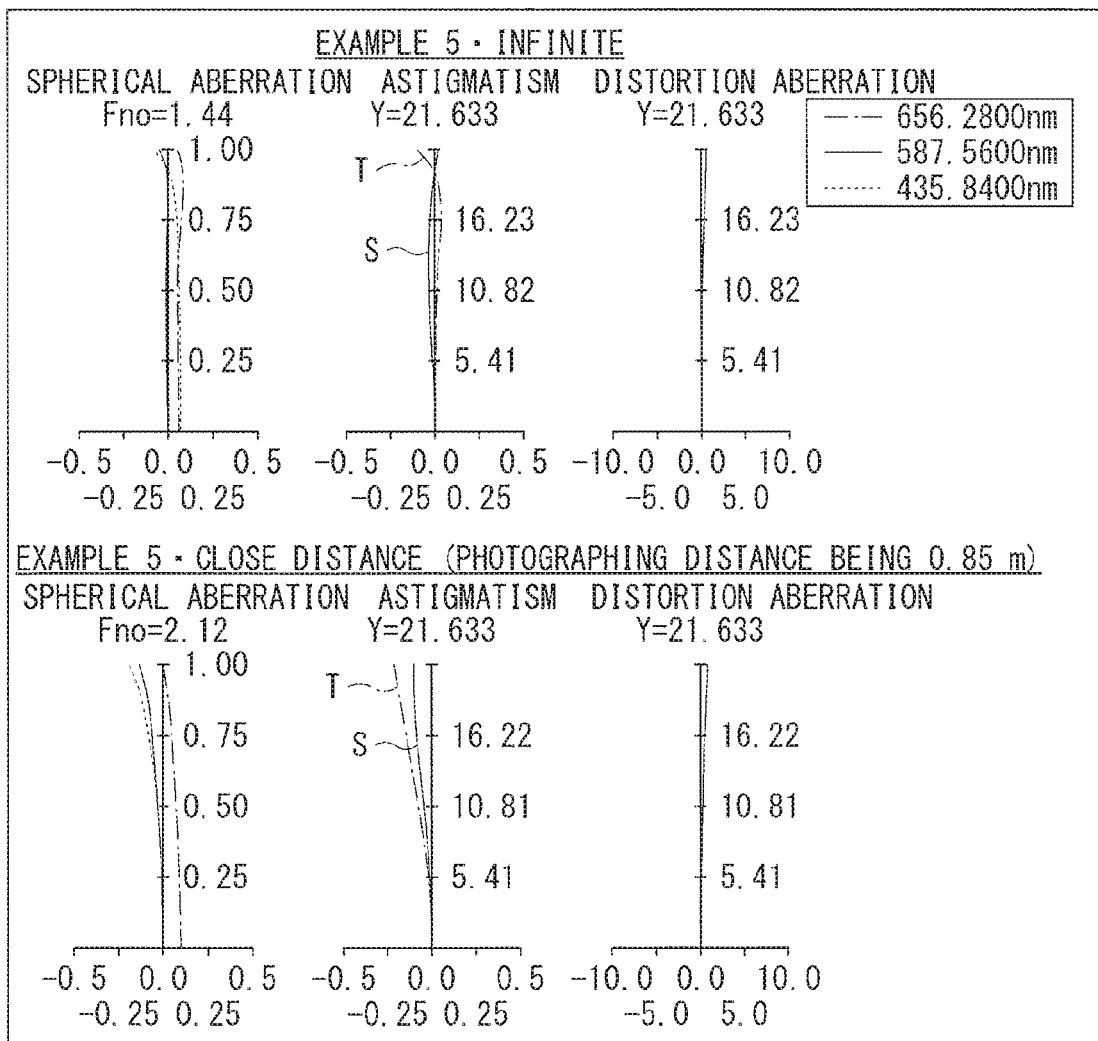

[ FIG. 11 ]
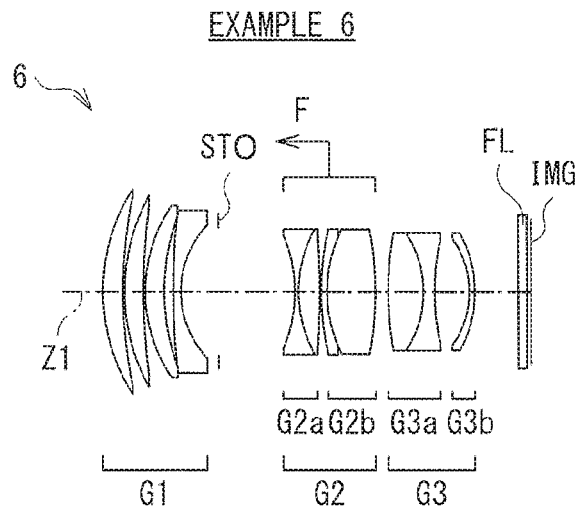
[ FIG. 12 ]
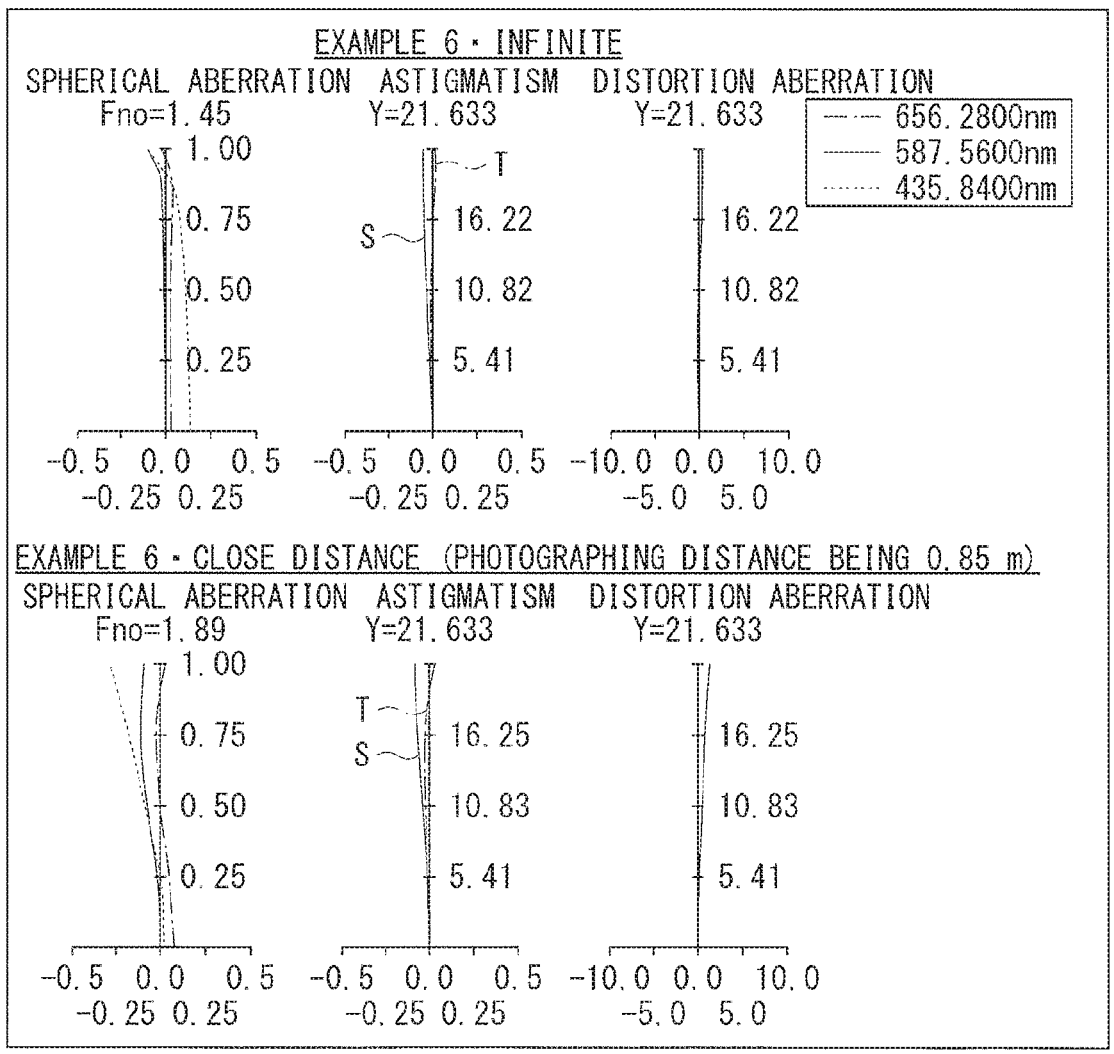

[ FIG. 13 ]
EXAMPLE 7
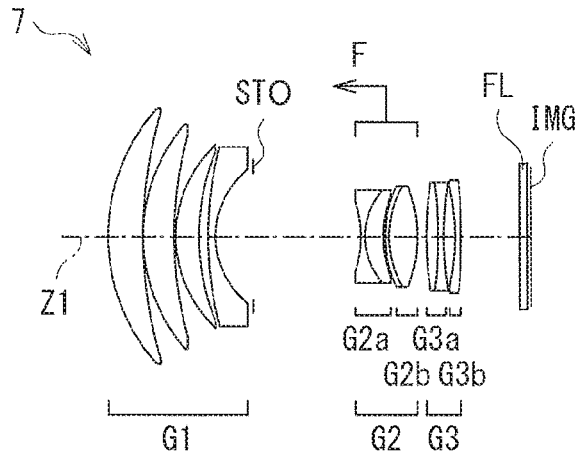
[ FIG. 14 ]
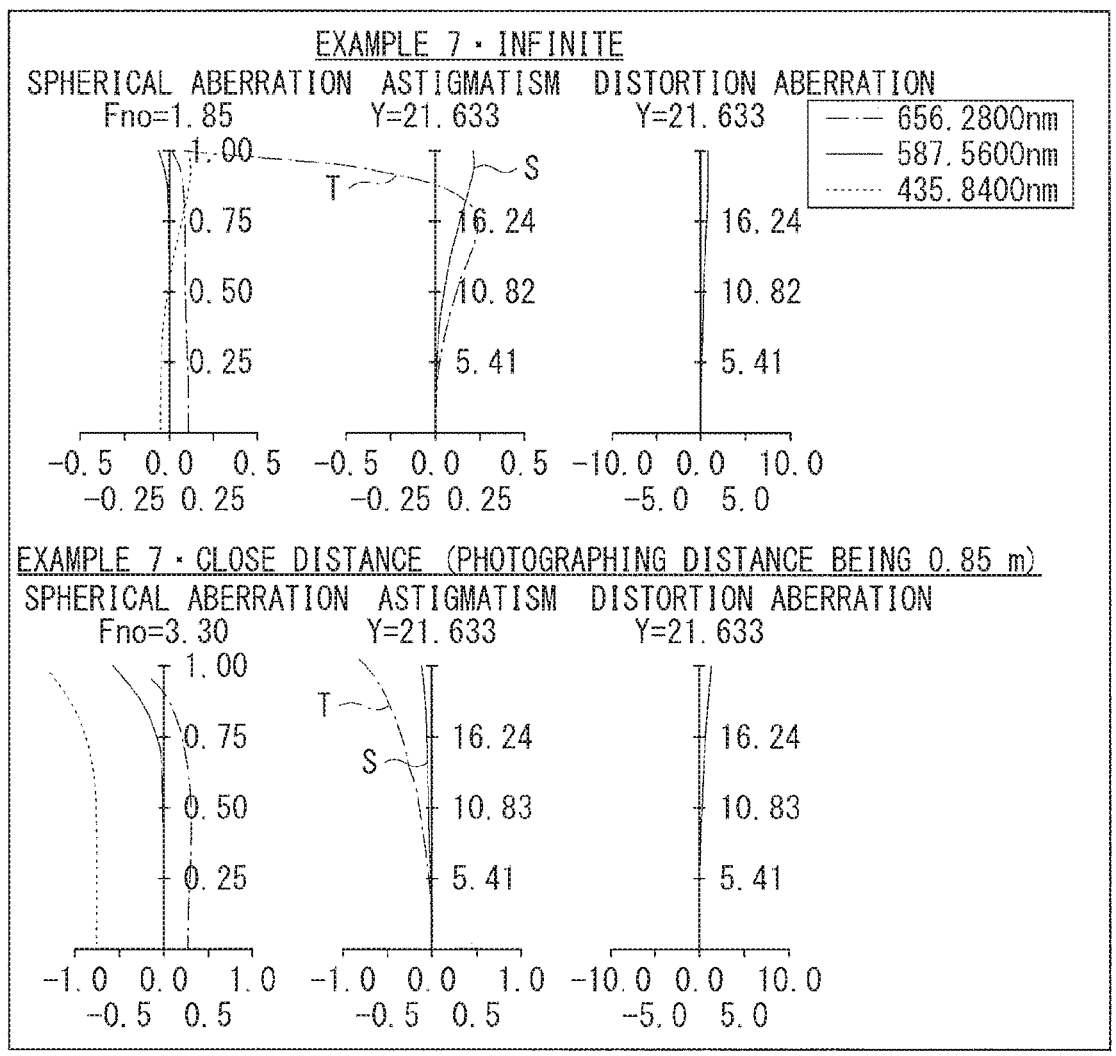

[ FIG. 15 ]
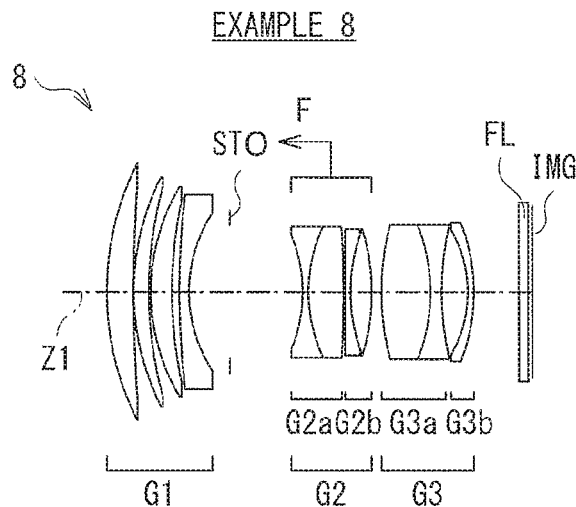
[ FIG. 16 ]
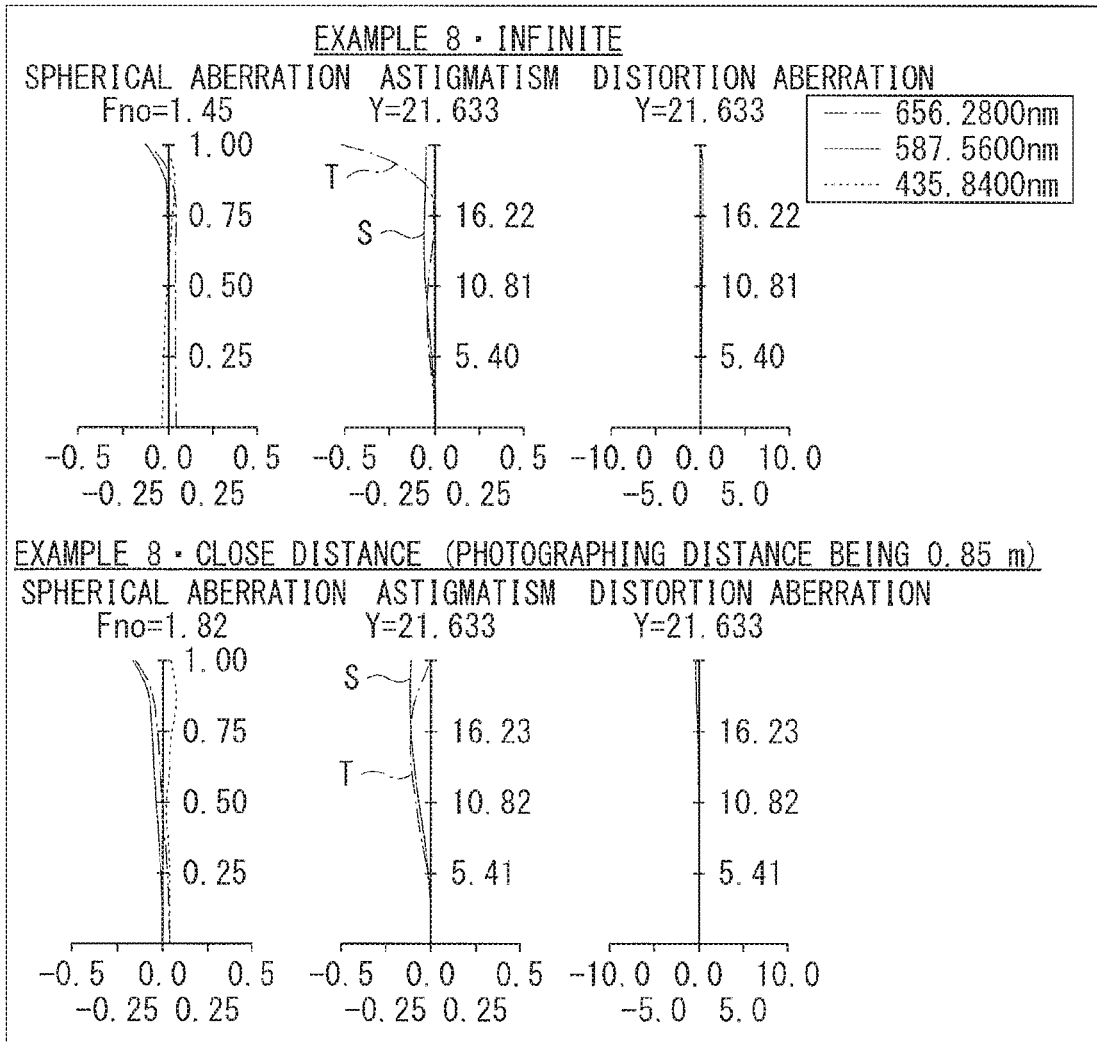

[ FIG. 17 ]
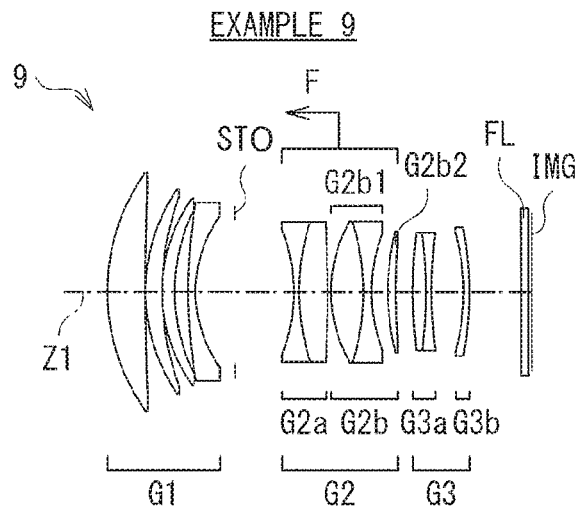
[ FIG. 18 ]
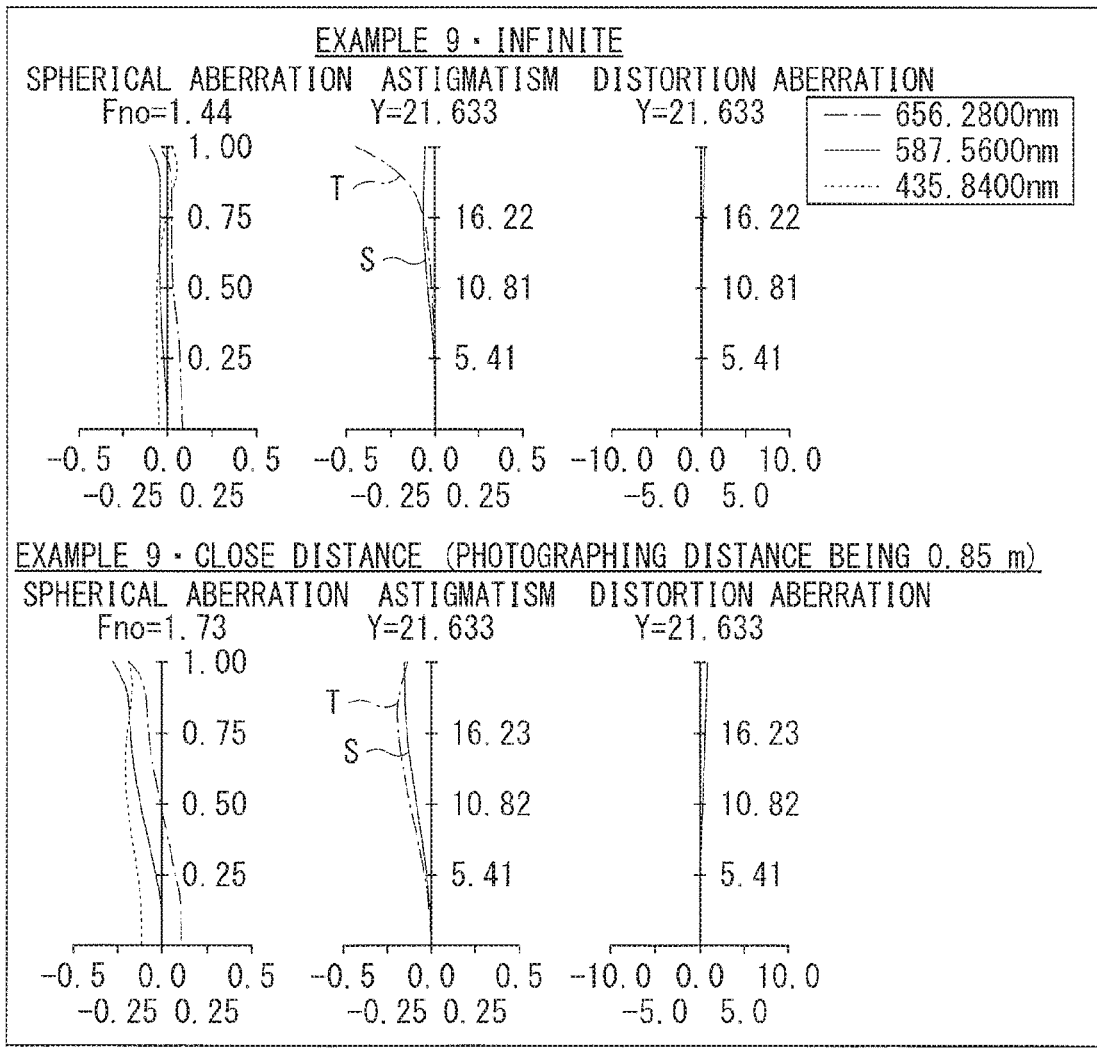

[ FIG. 19 ]
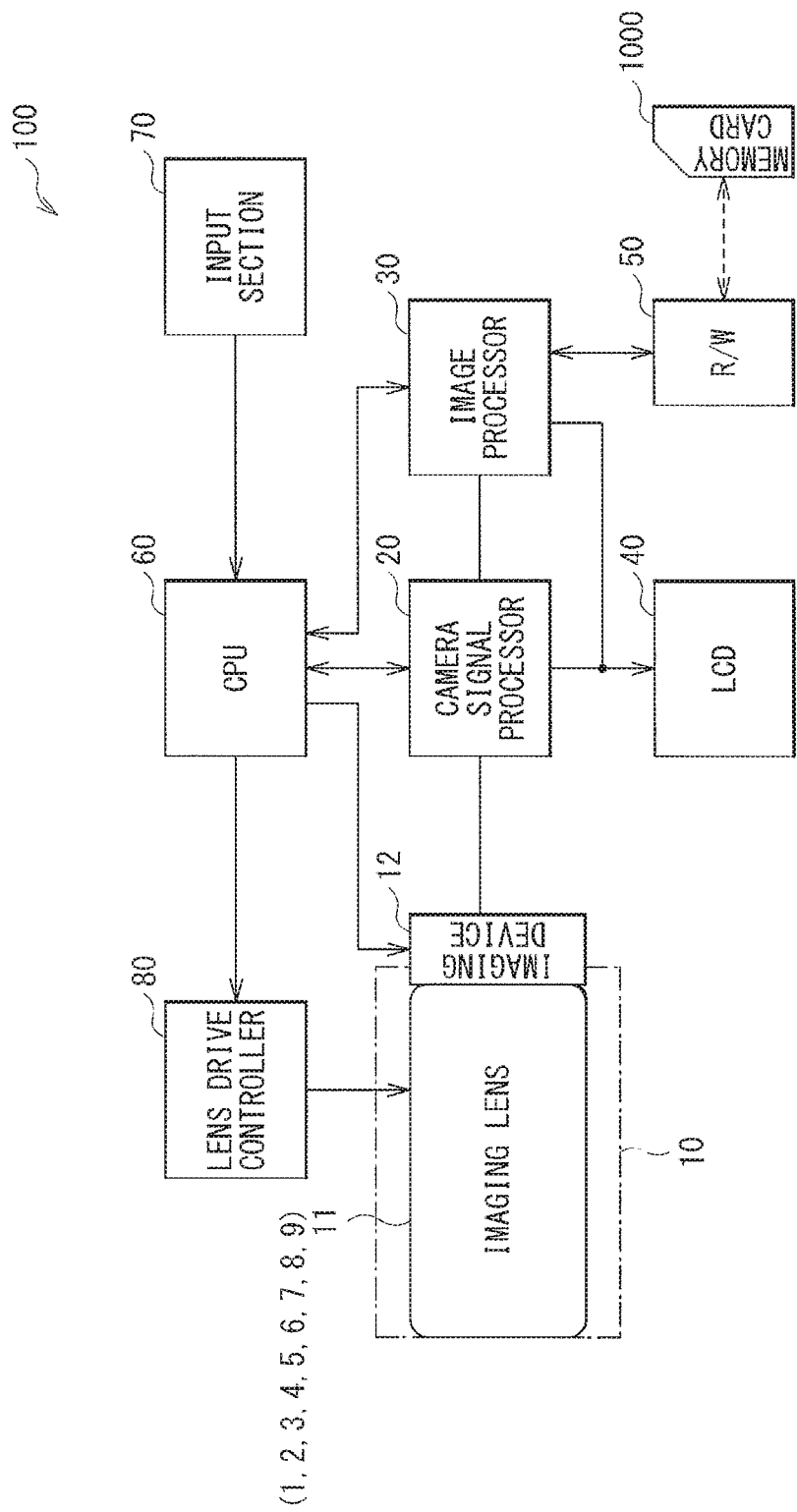

IMAGING LENS AND IMAGING APPARATUS

TECHNICAL FIELD

The disclosure relates to an imaging lens and an imaging apparatus. In more detail, the disclosure relates to a high performance, compact imaging lens suitable for an interchangeable lens that is mountable to, in particular, a digital still camera or a digital mirrorless camera, and an imaging apparatus including such an imaging lens.

BACKGROUND ART

In recent years, digital still cameras, digital mirrorless cameras, etc. using a solid-state imaging device such as a CCD (Charged Coupled Device) and a CMOS (Complementary Metal-Oxide Semiconductor) have spread rapidly. The spread of such digital cameras, etc. leads to higher demand of a high performance imaging lens corresponding to the large number of pixels. Furthermore, such demand has been recently increasing not only for a zoom lens but also for a single focal lens having a fixed focal length.

Such a single focal lens is expected, as a need, to have a high-performance large aperture lens having maximum aperture of approximately F/1.4. Such an imaging lens is known, for example, as imaging lens systems disclosed in PTL 1 and PTL 2. The imaging lens system disclosed in PTL 1 is a single focal lens having a half angle of view of approximately 6° to 9° and maximum aperture of approximately F/2.0 to F/2.8. The single focal lens is characterized by including a first group having positive or negative refractive power, a second group having positive refractive power, and a third group having positive or negative refractive power, which are arranged from the object side thereof, in which the second group moves, on the optical axis, to perform focusing an object at a short distance. The imaging lens system disclosed in PTL 2 is a single focal lens having a half angle of view of approximately 14° and maximum aperture of approximately F/1.4. The single focal lens is characterized by including a first group having positive refractive power and a second group having positive refractive power, which are arranged from the object side thereof, in which the second group moves, on the optical axis, to focus an object at a short distance.

CITATION LIST

Patent Literature

PTL 1: Japanese Unexamined Patent Application Publication No. 2011-128273
PTL 2: Japanese Unexamined Patent Application Publication No. 2009-244699

SUMMARY OF THE INVENTION

However, imaging lens systems disclosed in PTL 1 and PTL2, when imaging devices in both of them are converted into the same size, are insufficient in performance in that comatic aberration or chromatic aberration of magnification in the state of a photographing distance being infinite and aberration variation upon focusing are large.

It is desirable to provide an imaging lens having small performance variation upon focusing while having a large aperture and favorable optical performance, and an imaging apparatus mounting such an imaging lens.

An imaging lens according to an embodiment of the disclosure includes, in order from object side toward image plane side, a first lens group having positive refractive power, a second lens group having a positive refractive power, and a third lens group having positive or negative refractive power, the first lens group being fixed with respect to an image plane, the second lens group traveling along an optical axis to the object side, and the third lens group being fixed with respect to the image plane, upon focusing from an object at infinite to an object at a short distance, the first lens group including, in order from the object side toward the image plane side, at least two positive lenses and a negative lens that is disposed closest to the image plane side in the first lens group, the second lens group including, in order from the object side toward the image plane side, a second a-lens component having negative refractive power and a second b-lens component having positive refractive power, and the third lens group including, in order from the object side toward the image plane side, a third a-lens component having positive refractive power and a third b-lens component having negative refractive power.

An imaging apparatus according to an embodiment of the disclosure includes an imaging lens and an imaging device that outputs an imaging signal corresponding to an optical image formed by the imaging lens, in which the imaging lens is configured with the imaging lens according to the embodiment of the disclosure.

The imaging lens or the imaging apparatus according to an embodiment of the disclosure includes a three-group configuration as a whole, and, upon focusing from an object at infinite to an object at a short distance, the first lens group is fixed with respect to the image plane, the second lens group travels along the optical axis to the object side, and the third lens group is fixed with respect to the image plane.

According to the imaging lens or the imaging apparatus according to an embodiment of the disclosure, optimization of the configuration of each group is achieved in the lens system with the three-group configuration as a whole. This makes it possible to achieve optical performance having small performance variation upon focusing while having a large aperture and favorable optical performance.

It is to be noted that effects described here are non-limiting. One or more of effects described in the disclosure may be provided.

BRIEF DESCRIPTION OF DRAWINGS

FIG. 1 is a lens cross sectional view of a first configuration example of an imaging lens according to an embodiment of the disclosure.

FIG. 2 is an aberration diagram illustrating a longitudinal aberration in a state of infinite focusing (upper row) and a longitudinal aberration in a state of close-distance focusing (a photographing distance being 0.85 m) (lower row), in Numerical Example 1 in which specific numerical values are applied to the imaging lens illustrated in FIG. 1.

FIG. 3 is a lens cross-sectional view of a second configuration example of an imaging lens.

FIG. 4 is an aberration diagram illustrating a longitudinal aberration in a state of infinite focusing (upper row) and a longitudinal aberration in a state of close-distance focusing (a photographing distance being 0.85 m) (lower row), in Numerical Example 2 in which specific numerical values are applied to the imaging lens illustrated in FIG. 3.

FIG. 5 is a lens cross-sectional view of a third configuration example of an imaging lens.

FIG. 6 is an aberration diagram illustrating a longitudinal aberration in a state of infinite focusing (upper row) and a longitudinal aberration in a state of close-distance focusing (a photographing distance being 0.85 m) (lower row), in Numerical Example 3 in which specific numerical values are applied to the imaging lens illustrated in FIG. 5.

FIG. 7 is a lens cross-sectional view of a fourth configuration example of an imaging lens.

FIG. 8 is an aberration diagram illustrating a longitudinal aberration in a state of infinite focusing (upper row) and a longitudinal aberration in a state of close-distance focusing (a photographing distance being 0.85 m) (lower row), in Numerical Example 4 in which specific numerical values are applied to the imaging lens illustrated in FIG. 7.

FIG. 9 is a lens cross-sectional view of a fifth configuration example of an imaging lens.

FIG. 10 is an aberration diagram illustrating a longitudinal aberration in a state of infinite focusing (upper row) and a longitudinal aberration in a state of close-distance focusing (a photographing distance being 0.85 m) (lower row), in Numerical Example 5 in which specific numerical values are applied to the imaging lens illustrated in FIG. 9.

FIG. 11 is a lens cross-sectional view of a sixth configuration example of an imaging lens.

FIG. 12 is an aberration diagram illustrating a longitudinal aberration in a state of infinite focusing (upper row) and a longitudinal aberration in a state of close-distance focusing (a photographing distance being 0.85 m) (lower row), in Numerical Example 6 in which specific numerical values are applied to the imaging lens illustrated in FIG. 11.

FIG. 13 is a lens cross-sectional view of a seventh configuration example of an imaging lens.

FIG. 14 is an aberration diagram illustrating a longitudinal aberration in a state of infinite focusing (upper row) and a longitudinal aberration in a state of close-distance focusing (a photographing distance being 0.85 m) (lower row), in Numerical Example 7 in which specific numerical values are applied to the imaging lens illustrated in FIG. 13.

FIG. 15 is a lens cross-sectional view of an eighth configuration example of an imaging lens.

FIG. 16 is an aberration diagram illustrating a longitudinal aberration in a state of infinite focusing (upper row) and a longitudinal aberration in a state of close-distance focusing (a photographing distance being 0.85 m) (lower row), in Numerical Example 8 in which specific numerical values are applied to the imaging lens illustrated in FIG. 15.

FIG. 17 is a lens cross-sectional view of a ninth configuration example of an imaging lens.

FIG. 18 is an aberration diagram illustrating a longitudinal aberration in a state of infinite focusing (upper row) and a longitudinal aberration in a state of close-distance focusing (a photographing distance being 0.85 m) (lower row), in Numerical Example 9 in which specific numerical values are applied to the imaging lens illustrated in FIG. 17.

FIG. 19 is a block diagram illustrating a configuration example of an imaging apparatus.

MODES FOR CARRYING OUT THE INVENTION

Some embodiments of the disclosure are described in detail below with reference to the drawings. It is to be noted that the description is given in the following order.
1. Basic Configuration of Lenses
2. Workings and Effects
3. Application Example to Imaging Apparatus
4. Numerical Examples of Lenses
5. Other Embodiments <1. Basic Configuration of Lenses>

FIG. 1 illustrates a first configuration example of an imaging lens according to an embodiment of the disclosure. FIG. 3 illustrates a second configuration example of an imaging lens. FIG. 5 illustrates a third configuration example of an imaging lens. FIG. 7 illustrates a fourth configuration example of an imaging lens. FIG. 9 illustrates a fifth configuration example of an imaging lens. FIG. 11 illustrates a sixth configuration example of an imaging lens. FIG. 13 illustrates a seventh configuration example of an imaging lens. Numerical examples in which specific numerical values are applied to these configuration examples are described later. FIG. 15 illustrates an eighth configuration example of an imaging lens. Numerical examples in which specific numerical values are applied to these configuration examples are described later. FIG. 17 illustrates a ninth configuration example of an imaging lens. Numerical examples in which specific numerical values are applied to these configuration examples are described later. In FIG. 1, etc., Z1 refers to an optical axis. Optical members such as a seal glass for protection of an imaging device or various kinds of optical filters FL may be provided between the imaging lens and an image plane IMG In the following, a configuration of the imaging lens according to the present embodiment is described as appropriate in a manner to be associated with the configuration examples illustrated in FIG. 1, etc. However, a technique of the disclosure is not limited to the illustrated configuration examples.

The imaging lens according to the present embodiment substantially includes three lens groups in which, in order from object side toward image plane side along the optical axis Z1, a first lens group G1 having positive refractive power, a second lens group G2 having positive refractive power, and a third lens group G3 having positive or negative refractive power are disposed.

In the imaging lens according to the present embodiment, the first lens group G1 is fixed with respect to the image plane IMG, the second lens group G2 travels to the object side along the optical axis, and the third lens group G3 is fixed with respect to the image plane IMG, upon focusing from an object at infinite to an object at a short distance.

In FIG. 1, etc., a lens cross section in a state of infinite focusing is illustrated. An arrow with a solid line denoted with F in FIG. 1, etc. indicates that the second lens group G2 travels in the arrow direction as a focus lens group, upon focusing from the object at infinite to the object at a short distance.

The first lens group G1 includes, in order from the object side toward the image plane side, at least two positive lenses and a negative lens that is disposed closest to the image plane side in the first lens group G1.

The second lens group G2 includes, in order from the object side toward the image plane side, a second a-lens component G2a having negative refractive power and a second b-lens component G2b having positive refractive power.

The third lens group G3 includes, in order from the object side toward the image plane side, a third a-lens component G3a having positive refractive power and a third b-lens component G3b having negative refractive power.

Aside from those described above, the imaging lens according to the present embodiment desirably satisfies later-described predetermined conditional expressions, etc.

<2. Workings and Effects>

Next, description is given of workings and effects of the imaging lens according to the present embodiment. Description is also given together of a desirable configuration of the imaging lens according to the present embodiment.

It is to be noted that the effects described in the present specification are illustrative and non-limiting. Effects other than those described in the present specification may be provided.

The imaging lens according to the present embodiment is provided, in a lens system including a three-group configuration as a whole, in such a manner that the configuration of each group is optimized, making it possible to achieve an optical performance having small performance variation upon focusing while having a large aperture and favorable optical performance.

In the imaging lens according to the present embodiment, the following conditional expression (1) is desirably satisfied:

$$-1.6 < f3b/f3a < 0 \tag{1}$$

where the focal length of the third a-lens component G3a is f3a, and the focal length of the third b-lens component G3b is f3b.

Satisfying the conditional expression (1) and appropriately setting refractive power of each lens component configuring the third lens group G3 make it possible to suppress various aberrations occurring in the third lens group G3, thereby achieving favorable optical performance. If a lower limit of the conditional expression (1) is exceeded, the negative refractive power of the third b-lens component G3b is relatively excessively weak, which makes it difficult to favorably correct field curvature and distortion aberration. If an upper limit of the conditional expression (1) is exceeded, the powers of the third a-lens component G3a and the third b-lens component G3b have the same signs to each other, which departs from the gist of the disclosure.

It is to be noted that a numerical range of the conditional expression (1) is further desirably set as in the following conditional expression (1)', in order to further favorably achieve the effect of the above-described conditional expression (1).

$$-1.0 < f3b/f3a < -0.1 \tag{1)'}$$

Further, in the imaging lens according to the present embodiment, the third b-lens component G3b desirably includes a single negative lens. In this case, the single negative lens of the third b-lens component G3b becomes a rearmost lens in the imaging lens according to the present embodiment. In this case, the following conditional expression (2) is favorably satisfied:

$$-10 < (r1+r2)/(r1-r2) < 0.0 \tag{2}$$

where the radius of curvature of the third b-lens component G3b on the object side is r1, and the radius of curvature of the third b-lens group G3b on the image plane side is r2.

Satisfying the conditional expression (2) does not cause extreme raising of a bundle of peripheral rays due to a rearmost lens surface, which makes it possible to suppress a pin-cushion distortion that is likely to occur in an optical system including a negative lens group configuring a rearmost lens group. Further, even in an optical system such as an interchangeable lens in which, in particular, a camera mount or a base thereof is disposed in its proximity and thereby it is difficult to ensure a lens diameter of the rearmost lens group, it becomes possible to ensure a relatively large effective aperture relative to a lens outer diameter, thereby bringing advantage in the improvement of optical performance and the reduction of sensitivity. Furthermore, it is possible to avoid a strong symmetric ghost generated due to the combination of either surface between the rearmost lens and a parallel plate-like optical device disposed in the proximity of an imaging device such as a cover glass, a low-pass filter, an IR cut filter, etc. of the imaging device. If a lower limit of the conditional expression (2) is exceeded, the rearmost lens does not have sufficient negative refractive power, and the diameter of an optical system that is disposed on the object side of the rearmost lens is larger, thereby bringing disadvantage in reduction in diameter size of a lens barrel. If an upper limit of the conditional expression (2) is exceeded, the refractive power of the rearmost lens surface is excessively strong, which makes it difficult to suppress distortion of the optical system or field curvature.

It is to noted that a numerical range of the conditional expression (2) is further desirably set as in the following conditional expression (2)', in order to further favorably achieve the effect of the above-described conditional expression (2).

$$-6.5 < (r1+r2)/(r1-r2) < -0.05 \tag{2)'}$$

Further, in the imaging lens according to the present embodiment, the second b-lens component G2b desirably includes a cemented lens having, in order from the object side to toward the image plane side, a negative lens and a positive lens.

It is to be noted that the imaging lens 1 of the first configuration example of FIG. 1, an imaging lens 2 of a second configuration example of FIG. 3, an imaging lens 4 of a fourth configuration example of FIG. 7, an imaging lens 6 of a sixth configuration example of FIG. 11, an imaging lens 7 of a seventh configuration example of FIG. 13, and an imaging lens 8 of an eighth configuration example of FIG. 15 satisfy this configuration.

In this case, the following conditional expression (3) is desirably satisfied:

$$0 < f2b/f2 < 1.6 \tag{3}$$

where the focal length of the second lens group G2 is f2, and the focal length of the second b-lens component G2b is f2b.

Satisfying the conditional expression (3) allows for favorable correction of spherical aberration or comatic aberration in the second lens group G2. If a lower limit of the conditional expression (3) is exceeded, the second b-lens component G2b does not have positive refractive power, which departs from the gist of the disclosure. If an upper limit of the conditional expression (3) exceeded, the positive power of the second b-lens component G2b is excessively weak, which makes it difficult to favorably correct an aberration in the second lens group G2.

It is to be noted that a numerical range of the conditional expression (3) is further desirably set as in the following conditional expression (3)', in order to further favorably achieve the effect of the above-described conditional expression (3).

$$0.25 < f2b/f2 < 1.3 \tag{3)'}$$

Further, in the imaging lens according to the present embodiment, the third a-lens component G3a desirably includes a cemented lens having, in order from the object side toward the image plane side, a positive lens and a negative lens.

It is to be noted that the imaging lens 1 of the first configuration example of FIG. 1, the imaging lens 2 of the second configuration example of FIG. 3, the imaging lens 6 of the sixth configuration example of FIG. 11, the imaging lens 7 of the seventh configuration example of FIG. 13, the imaging lens 8 of the eighth configuration example of FIG. 15, and an imaging lens 9 of a ninth configuration example of FIG. 17 satisfy this configuration.

Further, in the imaging lens according to the present embodiment, the second lens group G2 desirably has positive refractive effect with respect to an on-axis bundle of rays and has an aspherical shape in which the positive refractive effect becomes weak toward the periphery of the effective aperture.

It is to be noted that the respective first to eighth imaging lenses 1 to 8 other than the imaging lens 9 of the ninth configuration example of FIG. 17 satisfy this configuration.

Such a configuration makes it possible to suppress the aberration generated due to the positive refractive effect in the second lens group G2 while the second lens group G2 has sufficient refractive power, which makes it possible to achieve favorable optical performance over the entire focusing region from the infinite to the close distance.

Further, in the imaging lens according to the present embodiment, the following conditional expression (4) is desirably satisfied:

$$-1.5<f1/f3<0.5 \quad (4)$$

where the focal length of the first lens group G1 is f1, and the focal length of the third lens group G3 is f3.

If a lower limit of the conditional expression (4) is exceeded, the negative refractive power of the third lens group G3 excessively strong, which makes it difficult to suppress the aberration generated in the third lens group G3. If an upper limit of the conditional expression (4) is exceeded, the negative refractive power of the third lens group G3 excessively weak, which makes it difficult to reduce the diameter size of the lens barrel relative to the imaging device.

It is to be noted that a numerical range of the conditional expression (4) is further desirably set as in the following conditional expression (4)', in order to further favorably achieve the effect of the above-described conditional expression (4).

$$-1.0<f1/f3<0.2 \quad (4)'$$

Further, in the imaging lens according to the present embodiment, the second a-lens component G2a desirably includes a cemented lens having, in order from the object side toward the image plane side, a negative lens and a positive lens. In this case, the following conditional expression (5) is desirably satisfied:

$$-35<f2a/f2<-4 \quad (5)$$

where the focal length of the second lens group G2 is f2, and the focal length of the second a-lens component G2a is f2a.

Satisfying the conditional expression (5) allows for favorable correction of the spherical aberration or the comatic aberration in the second lens group G2. If a lower limit of the conditional expression (5) is exceeded, the negative power of the second a-lens component G2a is excessively weak, which makes it difficult to favorably correct the aberration in the second lens group G2. If an upper limit of the conditional expression (5) is exceeded, the negative power of the second a-lens component G2a is excessively strong, which similarly makes it difficult to favorably correct the aberration in the second lens group G2.

It is to be noted that a numerical range of the conditional expression (5) is further desirably set as in the following conditional expression (5)', in order to further favorably achieve the effect of the above-described conditional expression (5).

$$-33<f2a/f2<-4 \quad (5)'$$

Further, in the imaging lens according to the present embodiment, the second b-lens component G2b may include, in order from the object side toward the image plane side, a second b1-lens component G2b1 and a second b2-lens component G2b2.

It is to be noted that an imaging lens 3 of the third configuration example of FIG. 5 and the imaging lens 9 of the ninth configuration example of FIG. 17 satisfy this configuration.

In this case, the following conditional expression (6) is desirably satisfied:

$$0<f2b2/f2b1<5 \quad (6)$$

where the focal length of the second b1-lens component G2b1 is f2b1, and the focal length of the second b2-lens component G2b2 is f2b2.

Satisfying the conditional expression (6) allows for appropriate setting of the power of the second b-lens component G2b and favorable correction of the aberration in the second lens group G2. If a lower limit of the conditional expression (6) is exceeded, the second b2-lens component G2b2 does not have positive refractive power, which makes it difficult to favorably correct the aberration in the state of the second b-lens component G2b having sufficient positive refractive power. If an upper limit of the conditional expression (6) is exceeded, a burden of the refractive power of the second b1-lens component G2b1 relative to the total second b-lens component G2b is excessively large, which makes it difficult to favorably correct the aberration in the second lens group G2.

Further, in the imaging lens according to the present embodiment, the following conditional expression is desirably satisfied:

$$-1.5<f2b/f2a<0.0 \quad (7)$$

where the focal length of the second a-lens component G2a is f2a, and the focal length of the second b-lens component G2b is f2b.

Satisfying the conditional expression (7) makes it possible to suppress the aberration generated in the second lens group G2 while the first lens group G1 has sufficient refractive power, which makes it possible to achieve favorable optical performance with a smaller size thereof. Further, the suppression of the aberration of the second lens group G2 allows for the maintenance of favorable optical performance from the infinite to the close distance. If a lower limit of the conditional expression (7) is exceeded, the refractive power of the second a-lens component G2a is excessively strong, which makes it difficult to favorably correct the spherical aberration or the comatic aberration. If an upper limit of the conditional expression (7) is exceeded, the refractive power of the second a-lens component G2a becomes positive, which departs from the gist of the disclosure.

It is to be noted that a numerical range of the conditional expression (7) is further desirably set as in the following conditional expression (7)', in order to further favorably achieve the effect of the above-described conditional expression (7). The numerical range thereof may be yet further desirably set as in the following conditional expression (7)".

$$-1.3<f2b/f2a<0.0 \quad (7)'$$

$$-1.0<f2b/f2a<0.0 \quad (7)''$$

Further, in the imaging lens according to the present embodiment, the lens surface positioned closest to the object side, of the second lens group G2 desirably has a concave shape on the object side.

Further, in the imaging lens according to the present embodiment, the following conditional expression is desirably satisfied:

$$-1<r\_2a/f<-0.1 \quad (8)$$

where the radius of curvature of the surface positioned closest to the object side, of the second a-lens component G2a is r_2a, and the focal length of the system as a whole is f.

Satisfying the conditional expression (8) makes it possible to cancel positive spherical aberration, comatic aberration, and other aberrations generated in the second lens group G2 having positive refractive power in the entire group, by a negative aberration generated on a concave surface of the frontmost one of the second lens group G2 thereby achieving a favorable aberration correction state. If a lower limit of the conditional expression (8) is exceeded, the negative spherical aberration or comatic aberration generated on the lens surface of the frontmost one of the second lens group G2 is excessively large, which makes it difficult to favorably maintain the optical performance. If an upper limit of the conditional expression (8) is exceeded, an amount of the negative spherical aberration and comatic aberration generated on the lens surface of the frontmost one of the second lens group G2 is insufficient, which makes it difficult to favorably correct the aberration in the state of the second lens group G2 as a whole maintaining satisfactory refractive power.

It is to be noted that a numerical range of the conditional expression (8) is further desirably set as in the following conditional expression (8)', in order to further favorably achieve the effect of the above-described conditional expression (8).

$$-0.7<r\_2a/f<-0.35 \quad (8)'$$

<3. Application Example to Imaging Apparatus>

FIG. 19 illustrates a configuration example of an imaging apparatus 100 to which the imaging lens according to the present embodiment is applied. The imaging apparatus 100 is, for example, a digital still camera, and includes a camera block 10, a camera signal processor 20, an image processor 30, an LCD (Liquid Crystal Display) 40, a R/W (reader/writer) 50, a CPU (Central Processing Unit) 60, and an input section 70, and a lens drive controller 80.

The camera block 10 serves an imaging function, and includes an optical system that includes an imaging lens 11 and an imaging device 12 such as CCD (Charge Coupled Devices) and a CMOS (Complementary Metal Oxide Semiconductor). The imaging device 12 converts an optical image formed by the imaging lens 11 into an electric signal, to thereby output an imaging signal (image signal) corresponding to the optical image. As the imaging lens 11, any of the imaging lenses 1 to 9 of the respective configuration examples respectively illustrated in FIGS. 1, 3, 5, 7, 9, 11, 13, 15, and 17 is applicable.

The camera signal processor 20 performs various kinds of signal processing such as analog-digital conversion, noise removal, image quality correction, and conversion to a luminance/color-difference signal, on the image signal outputted from the imaging device 12.

The image processor 30 performs processing of recording and reproduction of an image signal, and performs processing of compression coding/expansion decoding of an image signal that is based on a predetermined image data format, conversion processing of data specification such as resolution, and the like.

The LCD 40 has a function of displaying various data such as a state of operation of the input section 70 by a user and a photographed image. The R/W 50 writes image data encoded by the image processor 30 into a memory card 1000, and reads the image data recorded in the memory card 1000. The memory card 1000 is, for example, a semiconductor memory detachable from a slot coupled to the R/W 50.

The CPU 60 functions as a control processor that controls each of circuit blocks provided in the imaging apparatus 100, and controls each of the circuit blocks on the basis of an instruction input signal, etc. from the input section 70. The input section 70 includes various switches, etc. by which predetermined operations are performed by a user. The input section 70 includes, for example, a shutter release button used to perform a shutter operation, a selection switch used to select an operation mode, and the like, and outputs to the CPU 60 an instruction input signal corresponding to a user's operation. The lens drive controller 80 controls driving of lenses disposed in the camera block 10, and controls an unillustrated motor, etc. that drives each of lenses of the imaging lens 11 on the basis of a control signal from the CPU 60.

In the following, description is given of operations in the imaging apparatus 100.

In a photographing standby state, an image signal photographed in the camera block 10 is outputted to the LCD 40 via the camera signal processor 20, and is displayed as a camera-through image, under control of the CPU 60. Further, for example, when an instruction input signal for focusing from the input section 70 is inputted, the CPU 60 outputs a control signal to the lens drive controller 80, and a predetermined lens of the imaging lens 11 travels on the basis of control of the lens drive controller 80.

When an unillustrated shutter of the camera block 10 is operated by the instruction input signal from the input section 70, the photographed image signal is outputted from the camera signal processor 20 to the image processor 30, and is subjected to a compression coding processing to be converted into digital data in a predetermined data format. The converted data are outputted to the R/W 50, and written into the memory card 1000.

It is to be noted that, the focusing is performed by the lens drive controller 80 causing a predetermined lens of the imaging lens 11 to move on the basis of the control signal from the CPU 60, for example, in a case where the shutter release button of the input section 70 is pressed halfway, in a case where the shutter release button of the input section 70 is pressed fully for recording (photographing), or in other cases.

In a case where the image data recorded in the memory card 1000 are reproduced, in accordance with an operation on the input section 70, predetermined image data are read from the memory card 1000 by the R/W 50, and are subjected to an expansion decoding processing by the image processor 30. Thereafter, a reproduction image signal is outputted to the LCD 40 to cause a reproduced image to be displayed.

It is to be noted that, although the above-described embodiment illustrates the example in which the imaging apparatus is applied to the digital still camera, an application range of the imaging apparatus is not limited to the digital still camera, and the imaging apparatus is applicable to other various imaging apparatuses. For example, the imaging apparatus is applicable to a single-lens reflex camera, a mirrorless camera, a digital video camera, a monitoring camera, and the like. Further, the imaging apparatus is applicable widely to a camera section, etc. of a digital input/output unit such as a mobile phone mounted with a camera and a PDA (Personal Digital Assistant) mounted with a camera. Further, the imaging apparatus is also applicable to an interchangeable-lens camera.

EXAMPLES

<4. Numerical Examples of Lenses>

Next, description is given of specific numerical examples of the imaging lens according to the present embodiment. Here, numerical examples in which specific numerical values are applied to the imaging lenses 1 to 9 of the respective configuration examples respectively illustrated in FIGS. 1, 3, 5, 7, 9, 11, 13, 15, and 17 are described.

It is to be noted that meanings, etc. of respective symbols indicated in the following tables and descriptions are as described below. "Surface No." denotes number of i-th surface that is numbered in such a manner that a surface of a component positioned closest to the object side is denoted as the first surface, and the number increases sequentially toward the image plane side. "Ri" denotes a value (mm) of a paraxial radius of curvature of the i-th surface. "Di" denotes a value (mm) of an interval on the optical axis between the i-th surface and (i+1)th surface. "Ndi" denotes a value of refractive index in d-line (wavelength being 587.6 nm) of a material of an optical component having the i-th surface. "vdi" denotes a value of Abbe number in the d-line of the material of the optical component having the i-th surface. A surface marked as "STO" in the "Surface No." denotes an aperture stop. A portion in which the value of "Ri" is "INF" denotes an aperture plane (the aperture stop). Furthermore, a portion in which the value of a photographing distance is "INF" indicates that the distance is infinite. "f" denotes a focal length of the lens system as a whole. "Fno" denotes an F number. "ω" denotes a half angle of view. "β" denotes magnification.

Some lenses used in each of numerical examples include a lens surface formed in an aspherical shape. The aspherical shape is defined by the following expression of an aspherical surface. It is to be noted that, in each of tables that indicate later-described aspherical coefficients, the symbol "E" denotes that a subsequent numerical value thereto is an exponent with 10 as a base, and the numerical value represented by the exponent function with 10 as a base is multiplied by a numerical value before "E". For example, "1.0E-05" is represented as "1.0*10$^{-5}$".

$$z(Y) = \frac{Y^2/R}{1 + (1 - (1+K)Y^2/R^2)^{1/2}} + A4 \cdot Y^4 + A6 \cdot Y^6 + A8 \cdot Y^8$$
[Numerical Expression 1]

Here, the algebraic notations in the above-described numerical expression for the aspherical surface are defined as follows.
Y: height in a direction perpendicular to an optical axis
z(Y): distance in an optical axis direction from an apex of a lens surface at a height Y
R: paraxial radius of curvature at an apex of a lens surface
K: Conic constant
Ai: an i-th order aspherical coefficient.

(Configuration Common to Respective Numerical Examples)

The imaging lenses 1 to 9 to which the following respective numerical examples are applied each have a configuration that satisfies the above-described basic configuration of the lenses. That is, the imaging lenses 1 to 9 each include substantially three lens groups in which the first lens group G1 having positive refractive power, the second lens group G2 having positive refractive power, and the third lens group G3 having positive or negative refractive power are disposed in order from the object side toward the image plane side. The second lens group G2 includes, in order from the object side toward the image plane side, the second a-lens component G2a having negative refractive power and the second b-lens component G2b having positive refractive power. The third lens group G3 includes, in order from the object side toward the image plane side, the third a-lens component G3a having positive refractive power and the third b-lens component G3b having negative refractive power.

Upon focusing from an object at the infinite to an object at the short distance, the first lens group G1 is fixed with respect to the image plane IMG, the second lens group G2 travels to the object side along the optical axis, and the third lens group G3 is fixed with respect to the image plane IMG.

The aperture stop STO is disposed between the first lens group G1 and the second lens group G2.

Numerical Example 1

Table 1 indicates lens data of Numerical Example 1 in which specific numerical values are applied to the imaging lens 1 illustrated in FIG. 1. It is to be noted that numerical values of the optical filter FL are omitted in Table 1.

In the imaging lens 1 according to Numerical Example 1, the first lens group G1 includes, in order from the object side toward the image plane side, three positive lenses each allowing a convex surface thereof to face the object side and a negative lens allowing a concave surface thereof to face the image plane side.

The second a-lens component G2a includes a cemented lens having, in order from the object side toward the image plane side, a negative lens and a positive lens. The second b-lens component G2b includes a cemented lens having, in order from the object side toward the image plane side, a negative lens and a positive lens.

The third lens group G3 has negative refractive power. The third a-lens component G3a includes a cemented lens having, in order from the object side toward the image plane side, a positive lens and a negative lens. The third b-lens component G3b includes a single negative lens.

The imaging lens 1 has an aspherical surface formed on a surface positioned closest to the object side, of the second b-lens component G2b (the 13th surface). This aspherical surface has an aspherical shape that has a positive refractive effect with respect to an on-axis bundle of rays, and in which the positive refractive effect becomes weak toward the periphery of the effective aperture. The values of coefficients at the aspherical surface are indicated in Table 2.

Table 3 indicates a value of the focal length of the lens system as a whole f at a time of infinite focusing, a value of F number Fno, and a value of a half angle of view ω. Further, Table 3 indicates a value of photographing distance (m) and a value of magnification β at the time of infinite focusing and finite-distance focusing.

Upon focusing in the imaging lens 1, a surface interval D9 between the aperture stop STO and the second lens group G2 varies, and a surface interval D15 between the second lens group G2 and the third lens group G3 varies. Values of the surface intervals at the time of infinite focusing and the time of finite-distance focusing are indicated in Table 3.

TABLE 1

Example 1

| Lens Group | Surface No. | Ri | Di | Ndi | vdi |
|---|---|---|---|---|---|
| G1 | 1 | 78.370 | 5.559 | 1.618 | 63.40 |
| | 2 | 200.097 | 0.500 | | |
| | 3 | 50.239 | 6.764 | 1.497 | 81.61 |
| | 4 | 118.022 | 0.300 | | |
| | 5 | 39.033 | 6.730 | 1.593 | 68.62 |
| | 6 | 71.365 | 2.300 | | |
| | 7 | 90.345 | 2.400 | 1.620 | 36.30 |
| | 8 | 29.159 | 11.110 | | |
| | 9 (STO) | INF | D9 | | |
| G2 | 10 | −33.917 | 1.500 | 1.593 | 35.45 |
| | 11 | 34.509 | 6.000 | 1.954 | 32.32 |
| | 12 | −153.761 | 0.540 | | |
| | 13 (Aspherical Surface) | 3998.542 | 1.500 | 1.821 | 24.06 |
| | 14 | 80.011 | 5.435 | 1.593 | 68.62 |
| | 15 | −40.008 | D15 | | |
| G3 | 16 | 95.536 | 8.432 | 1.911 | 35.25 |
| | 17 | −45.999 | 1.500 | 1.593 | 35.45 |
| | 18 | 73.810 | 6.148 | | |
| | 19 | −36.737 | 1.600 | 1.569 | 56.04 |
| | 20 | −134.175 | | | |

TABLE 2

Example 1 • Aspherical Surface Coefficient

| Surface No. | Order | Coefficient |
|---|---|---|
| 13 (Aspherical Surface) | K | 0.00000E+00 |
| | A4 | −4.82141E−06 |
| | A6 | −1.85143E−09 |
| | A8 | 1.67151E−12 |

TABLE 3

Example 1

| | At time of Infinite Focusing | At time of Finite-Distance Focusing |
|---|---|---|
| Fno | 1.45 | — |
| f | 71.99 | — |
| ω | 16.73 | — |
| Photographing Distance (m) | INF | 0.85 |
| β | 0.000 | 0.095 |
| D9 | 17.274 | 6.378 |
| D15 | 3.711 | 14.608 |

FIG. 2 illustrates a longitudinal aberration in a state of infinite focusing (upper row) and a longitudinal aberration in a state of close-distance focusing (photographing distance being 0.85 m) (lower row) in Numerical Example 1. FIG. 2 illustrates, as the longitudinal aberration, spherical aberration, astigmatism (field curvature), and distortion (distortion aberration). In an aberration diagram for each astigmatism, a solid line (S) indicates a value in a sagittal image plane, and a broken line (T) indicates a value in a meridional image plane. An aberration diagram for each spherical aberration indicates values in the wavelength of 587.56 nm, the wavelength of 656.28 nm, and the wavelength of 435.84 nm. The same also applies to aberration diagrams in other numeral examples described hereinafter.

As can be appreciated from each of the aberration diagrams, in the imaging lens 1 according to Numerical Example 1, the aberrations are each favorably corrected in the state of infinite focusing and in the state of close-distance focusing, and thus it is clear that the imaging lens 1 according to Numerical Example 1 has small performance variation upon focusing and thus a superior image-forming performance.

Numerical Example 2

Table 4 indicates lens data of Numerical Example 2 in which specific numerical values are applied to the imaging lens 2 illustrated in FIG. 3.

In the imaging lens 2 according to Numerical Example 2, the first lens group G1 includes, in order from the object side toward the image plane side, three positive lenses each allowing a convex surface thereof to face the object side and a negative lens allowing a concave surface thereof to face the image plane side.

The second a-lens component G2a includes a cemented lens having, in order from the object side toward the image plane side, a negative lens and a positive lens. The second b-lens component G2b includes a cemented lens having, in order from the object side toward the image plane side, a negative lens and a positive lens.

The third lens group G3 has negative refractive power. The third a-lens component G3a includes a cemented lens having, in order from the object side toward the image plane side, a positive lens and a negative lens. The third b-lens component G3b includes a single negative lens.

The imaging lens 2 has an aspherical surface formed on a surface positioned closest to the object side, of the second b-lens component G2b (the 13th surface). This aspherical surface has an aspherical shape that has a positive refractive effect with respect to an on-axis bundle of rays, and in which the positive refractive effect becomes weak toward the periphery of the effective aperture. The values of coefficients at the aspherical surface are indicated in Table 5.

Table 6 indicates a value of the focal length of the lens system as a whole f at a time of infinite focusing, a value of F number Fno, and a value of a half angle of view ω. Further, Table 6 indicates a value of photographing distance (m) and a value of magnification β at the time of infinite focusing and finite-distance focusing.

Upon focusing in the imaging lens 2, a surface interval D9 between the aperture stop STO and the second lens group G2 varies, and a surface interval D15 between the second lens group G2 and the third lens group G3 varies. Values of the surface intervals at the time of infinite focusing and the time of finite-distance focusing are indicated in Table 6.

TABLE 4

Example 2

| Lens Group | Surface No. | Ri | Di | Ndi | vdi |
|---|---|---|---|---|---|
| G1 | 1 | 53.409 | 7.177 | 1.618 | 63.40 |
| | 2 | 133.550 | 0.500 | | |
| | 3 | 55.873 | 6.013 | 1.497 | 81.61 |
| | 4 | 155.451 | 0.300 | | |
| | 5 | 43.037 | 5.272 | 1.593 | 68.62 |
| | 6 | 61.127 | 3.026 | | |
| | 7 | 121.720 | 2.400 | 1.620 | 36.30 |
| | 8 | 30.425 | 10.900 | | |
| | 9 (STO) | INF | D9 | | |
| G2 | 10 | −57.485 | 1.500 | 1.620 | 36.30 |
| | 11 | 29.166 | 9.168 | 2.001 | 29.13 |

TABLE 4-continued

Example 2

| Lens Group | Surface No. | Ri | Di | Ndi | vdi |
|---|---|---|---|---|---|
| | 12 | 293.577 | 0.570 | | |
| | 13 (Aspherical Surface) | 122.730 | 1.500 | 1.821 | 24.06 |
| | 14 | 48.001 | 14.955 | 1.593 | 68.62 |
| | 15 | −50.259 | D15 | | |
| G3 | 16 | 216.748 | 15.000 | 2.001 | 29.13 |
| | 17 | −50.452 | 2.566 | 1.755 | 27.53 |
| | 18 | 122.664 | 4.000 | | |
| | 19 | −51.592 | 1.600 | 1.569 | 56.04 |
| | 20 | −270.536 | | | |

TABLE 5

Example 2 • Aspherical Surface Coefficient

| Surface No. | Order | Coefficient |
|---|---|---|
| 13 (Aspherical Surface) | K | 0.00000E+00 |
| | A4 | −4.98661E−06 |
| | A6 | −2.69634E−09 |
| | A8 | 1.87534E−12 |

TABLE 6

Example 2

| | At time of Infinite Focusing | At time of Finite-Distance Focusing |
|---|---|---|
| Fno | 1.45 | — |
| f | 86.85 | — |
| ω | 13.99 | — |
| Photographing Distance (m) | INF | 0.85 |
| β | 0.000 | 0.118 |
| D9 | 17.857 | 5.761 |
| D15 | 3.000 | 15.097 |

FIG. 4 illustrates a longitudinal aberration in a state of infinite focusing (upper row) and a longitudinal aberration in a state of close-distance focusing (photographing distance being 0.85 m) (lower row) in Numerical Example 2.

As can be appreciated from each of the aberration diagrams, in the imaging lens 2 according to Numerical Example 2, the aberrations are each favorably corrected in the state of infinite focusing and in the state of close-distance focusing, and thus it is clear that the imaging lens 2 according to Numerical Example 2 has small performance variation upon focusing and thus a superior image-forming performance.

Numerical Example 3

Table 7 indicates lens data of Numerical Example 3 in which specific numerical values are applied to the imaging lens 3 illustrated in FIG. 5.

In the imaging lens 3 according to Numerical Example 3, the first lens group G1 includes, in order from the object side toward the image plane side, three positive lenses each allowing a convex surface thereof to face the object side and a negative lens allowing a concave surface thereof to face the image plane side.

The second a-lens component G2a includes a cemented lens having, in order from the object side toward the image plane side, a negative lens and a positive lens.

The second b-lens component G2b includes, in order from the object side toward the image plane side, the second b1-lens component G2b1 and the second b2-lens component G2b2. The second b1-lens component G2b1 includes a single positive lens. The second b2-lens component G2b2 includes a single positive lens.

The third lens group G3 has negative refractive power. The third a-lens component G3a includes a single positive lens. The third b-lens component G3b includes a single negative lens.

The imaging lens 3 has an aspherical surface formed on a surface positioned closest to the object side, of the second b-lens component G2b (the 13th surface). This aspherical surface has an aspherical shape that has a positive refractive effect with respect to an on-axis bundle of rays, and in which the positive refractive effect becomes weak toward the periphery of the effective aperture. The values of coefficients at the aspherical surface are indicated in Table 8.

Table 9 indicates a value of the focal length of the lens system as a whole f at a time of infinite focusing, a value of F number Fno, and a value of a half angle of view ω. Further, Table 9 indicates a value of photographing distance (m) and a value of magnification β at the time of infinite focusing and finite-distance focusing.

Upon focusing in the imaging lens 3, a surface interval D9 between the aperture stop STO and the second lens group G2 varies, and a surface interval D16 between the second lens group G2 and the third lens group G3 varies. Values of the surface intervals at the time of infinite focusing and the time of finite-distance focusing are indicated in Table 9.

TABLE 7

Example 3

| Lens Group | Surface No. | Ri | Di | Ndi | vdi |
|---|---|---|---|---|---|
| G1 | 1 | 53.552 | 11.146 | 1.618 | 63.40 |
| | 2 | 173.342 | 0.500 | | |
| | 3 | 53.438 | 5.202 | 1.497 | 81.61 |
| | 4 | 82.165 | 0.300 | | |
| | 5 | 39.118 | 6.901 | 1.593 | 68.62 |
| | 6 | 70.836 | 2.300 | | |
| | 7 | 110.339 | 2.400 | 1.620 | 36.30 |
| | 8 | 27.119 | 11.110 | | |
| | 9 (STO) | INF | D9 | | |
| G2 | 10 | −51.906 | 1.500 | 1.762 | 26.61 |
| | 11 | 29.556 | 6.000 | 2.001 | 29.13 |
| | 12 | 481.187 | 0.540 | | |
| | 13 (Aspherical Surface) | 238.435 | 10.141 | 1.882 | 37.22 |
| | 14 | −74.319 | 3.000 | | |
| | 15 | −58.561 | 3.000 | 1.497 | 81.61 |
| G3 | 16 | −41.545 | D16 | | |
| | 17 | 107.189 | 8.359 | 1.911 | 35.25 |
| | 18 | 153.557 | 4.000 | | |
| | 19 | −132.410 | 1.600 | 1.497 | 81.61 |
| | 20 | 157.820 | | | |

TABLE 8

Example 3 • Aspherical Surface Coefficient

| Surface No. | Order | Coefficient |
|---|---|---|
| 13 (Aspherical Surface) | K | 0.00000E+00 |
| | A4 | −4.06848E−06 |
| | A6 | −1.26987E−09 |
| | A8 | −1.16332E−12 |

TABLE 9

Example 3

|  | At time of Infinite Focusing | At time of Finite-Distance Focusing |
|---|---|---|
| Fno | 1.44 | — |
| f | 97.50 | — |
| ω | 12.51 | — |
| Photographing Distance (m) | INF | 0.85 |
| β | 0.000 | 0.129 |
| D9 | 22.069 | 5.714 |
| D16 | 2.319 | 18.674 |

FIG. 6 illustrates a longitudinal aberration in a state of infinite focusing (upper row) and a longitudinal aberration in a state of close-distance focusing (photographing distance being 0.85 m) (lower row) in Numerical Example 3.

As can be appreciated from each of the aberration diagrams, in the imaging lens 3 according to Numerical Example 3, the aberrations are each favorably corrected in the state of infinite focusing and in the state of close-distance focusing, and thus it is clear that the imaging lens 3 according to Numerical Example 3 has small performance variation upon focusing and thus a superior image-forming performance.

Numerical Example 4

Table 10 indicates lens data of Numerical Example 4 in which specific numerical values are applied to the imaging lens 4 illustrated in FIG. 7.

In the imaging lens 4 according to Numerical Example 4, the first lens group G1 includes, in order from the object side toward the image plane side, three positive lenses each allowing a convex surface thereof to face the object side and a negative lens allowing a concave surface thereof to face the image plane side.

The second a-lens component G2a includes a cemented lens having, in order from the object side toward the image plane side, a negative lens and a positive lens. The second b-lens component G2b includes a cemented lens having, in order from the object side toward the image plane side, a negative lens and a positive lens.

The third lens group G3 has negative refractive power. The third a-lens component G3a includes a single positive lens. The third b-lens component G3b includes a single negative lens.

The imaging lens 4 has an aspherical surface formed on a surface positioned closest to the object side, of the second b-lens component G2b (the 13th surface). This aspherical surface has an aspherical shape that has a positive refractive effect with respect to an on-axis bundle of rays, and in which the positive refractive effect becomes weak toward the periphery of the effective aperture. The values of coefficients at the aspherical surface are indicated in Table 11.

Table 12 indicates a value of the focal length of the lens system as a whole f at a time of infinite focusing, a value of F number Fno, and a value of a half angle of view ω. Further, Table 12 indicates a value of photographing distance (m) and a value of magnification β at the time of infinite focusing and finite-distance focusing.

Upon focusing in the imaging lens 4, a surface interval D9 between the aperture stop STO and the second lens group G2 varies, and a surface interval D15 between the second lens group G2 and the third lens group G3 varies. Values of the surface intervals at the time of infinite focusing and the time of finite-distance focusing are indicated in Table 12.

TABLE 10

Example 4

| Lens Group | Surface No. | Ri | Di | Ndi | νdi |
|---|---|---|---|---|---|
| G1 | 1 | 51.182 | 10.042 | 1.618 | 63.40 |
|  | 2 | 164.926 | 0.500 |  |  |
|  | 3 | 52.268 | 5.267 | 1.497 | 81.61 |
|  | 4 | 89.445 | 0.300 |  |  |
|  | 5 | 38.611 | 6.472 | 1.593 | 68.62 |
|  | 6 | 68.209 | 2.300 |  |  |
|  | 7 | 113.172 | 2.400 | 1.648 | 33.84 |
|  | 8 | 27.132 | 11.110 |  |  |
|  | 9 (STO) | INF | D9 |  |  |
| G2 | 10 | −46.927 | 1.500 | 1.699 | 30.05 |
|  | 11 | 30.386 | 6.000 | 2.001 | 29.13 |
|  | 12 | −340.633 | 0.540 |  |  |
|  | 13 (Aspherical Surface) | 405.066 | 1.500 | 1.809 | 40.96 |
|  | 14 | 83.307 | 12.288 | 1.593 | 68.62 |
|  | 15 | −43.793 | D15 |  |  |
| G3 | 16 | 65.535 | 9.592 | 1.911 | 35.25 |
|  | 17 | 70.742 | 4.000 |  |  |
|  | 18 | −90.076 | 1.600 | 1.518 | 58.96 |
|  | 19 | 357.802 |  |  |  |

TABLE 11

Example 4 • Aspherical Surface Coefficient

| Surface No. | Order | Coefficient |
|---|---|---|
| 13 (Aspherical Surface) | K | 0.00000E+00 |
|  | A4 | −4.90973E−06 |
|  | A6 | −2.12703E−09 |
|  | A8 | 3.00682E−13 |

TABLE 12

Example 4

|  | At time of Infinite Focusing | At time of Finite-Distance Focusing |
|---|---|---|
| Fno | 1.44 | — |
| f | 91.62 | — |
| ω | 13.29 | — |
| Photographing Distance (m) | INF | 0.85 |
| β | 0.000 | 0.120 |
| D9 | 20.820 | 5.631 |
| D15 | 3.226 | 18.415 |

FIG. 8 illustrates a longitudinal aberration in a state of infinite focusing (upper row) and a longitudinal aberration in a state of close-distance focusing (photographing distance being 0.85 m) (lower row) in Numerical Example 4.

As can be appreciated from each of the aberration diagrams, in the imaging lens 4 according to Numerical Example 4, the aberrations are each favorably corrected in the state of infinite focusing and in the state of close-distance focusing, and thus it is clear that the imaging lens 4 according to Numerical Example 4 has small performance variation upon focusing and thus a superior image-forming performance.

Numerical Example 5

Table 13 indicates lens data of Numerical Example 5 in which specific numerical values are applied to the imaging lens 5 illustrated in FIG. 9.

In the imaging lens 5 according to Numerical Example 5, the first lens group G1 includes, in order from the object side toward the image plane side, two positive lenses each allowing a convex surface thereof to face the object side and a negative lens allowing a concave surface thereof to face the image plane side.

The second a-lens component G2a includes a cemented lens having, in order from the object side toward the image plane side, a negative lens and a positive lens. The second b-lens component G2b includes a single positive lens.

The third lens group G3 has negative refractive power. The third a-lens component G3a includes a single positive lens. The third b-lens component G3b includes a single negative lens.

The imaging lens 5 has an aspherical surface formed on a surface positioned closest to the object side, of the second b-lens component G2b (the 11th surface). This aspherical surface has an aspherical shape that has a positive refractive effect with respect to an on-axis bundle of rays, and in which the positive refractive effect becomes weak toward the periphery of the effective aperture. The values of coefficients at the aspherical surface are indicated in Table 14.

Table 15 indicates a value of the focal length of the lens system as a whole f at a time of infinite focusing, a value of F number Fno, and a value of a half angle of view ω. Further, Table 15 indicates a value of photographing distance (m) and a value of magnification β at the time of infinite focusing and finite-distance focusing.

Upon focusing in the imaging lens 5, a surface interval D7 between the aperture stop STO and the second lens group G2 varies, and a surface interval D12 between the second lens group G2 and the third lens group G3 varies. Values of the surface intervals at the time of infinite focusing and the time of finite-distance focusing are indicated in Table 15.

TABLE 13

Example 5

| Lens Group | Surface No. | Ri | Di | Ndi | vdi |
|---|---|---|---|---|---|
| G1 | 1 | 56.883 | 11.005 | 1.618 | 63.40 |
|  | 2 | 535.031 | 0.500 |  |  |
|  | 3 | 38.147 | 7.810 | 1.593 | 68.62 |
|  | 4 | 91.524 | 2.300 |  |  |
|  | 5 | 177.018 | 2.400 | 1.603 | 38.01 |
|  | 6 | 28.282 | 11.110 |  |  |
|  | 7 (STO) | INF | D7 |  |  |
| G2 | 8 | −45.817 | 1.500 | 1.762 | 26.61 |
|  | 9 | 30.259 | 6.950 | 2.001 | 29.13 |
|  | 10 | 368.846 | 0.540 |  |  |
|  | 11 (Aspherical Surface) | 158.015 | 10.601 | 1.882 | 37.22 |
|  | 12 | −57.646 | D12 |  |  |
| G3 | 13 | 270.631 | 13.435 | 1.729 | 54.67 |
|  | 14 | −91.251 | 7.559 |  |  |
|  | 15 | −54.329 | 1.600 | 1.620 | 36.30 |
|  | 16 | 305.400 |  |  |  |

TABLE 14

Example 5 • Aspherical Surface Coefficient

| Surface No. | Order | Coefficient |
|---|---|---|
| 11 (Aspherical Surface) | K | 0.00000E+00 |
|  | A4 | −3.39643E−06 |
|  | A6 | −8.85193E−10 |
|  | A8 | −6.12546E−13 |

TABLE 15

Example 5

|  | At time of Infinite Focusing | At time of Finite-Distance Focusing |
|---|---|---|
| Fno | 1.44 | — |
| f | 86.08 | — |
| ω | 14.11 | — |
| Photographing Distance (m) | INF | 0.85 |
| β | 0.000 | 0.118 |
| D7 | 20.315 | 5.588 |
| D12 | 6.325 | 21.053 |

FIG. 10 illustrates a longitudinal aberration in a state of infinite focusing (upper row) and a longitudinal aberration in a state of close-distance focusing (photographing distance being 0.85 m) (lower row) in Numerical Example 5.

As can be appreciated from each of the aberration diagrams, in the imaging lens 5 according to Numerical Example 5, the aberrations are each favorably corrected in the state of infinite focusing and in the state of close-distance focusing, and thus it is clear that the imaging lens 5 according to Numerical Example 5 has small performance variation upon focusing and thus a superior image-forming performance.

Numerical Example 6

Table 16 indicates lens data of Numerical Example 6 in which specific numerical values are applied to the imaging lens 6 illustrated in FIG. 11.

In the imaging lens 6 according to Numerical Example 6, the first lens group G1 includes, in order from the object side toward the image plane side, three positive lenses each allowing a convex surface thereof to face the object side and a negative lens allowing a concave surface thereof to face the image plane side.

The second a-lens component G2a includes a cemented lens having, in order from the object side toward the image plane side, a negative lens and a positive lens. The second b-lens component G2b includes a cemented lens having, in order from the object side toward the image plane side, a negative lens and a positive lens.

The third lens group G3 has negative refractive power. The third a-lens component G3a includes a cemented lens having, in order from the object side toward the image plane side, a positive lens and a negative lens. The third b-lens component G3b includes a single negative lens.

The imaging lens 6 has an aspherical surface formed on a surface positioned closest to the object side, of the second b-lens component G2b (the 15th surface). This aspherical surface has an aspherical shape that has a positive refractive effect with respect to an on-axis bundle of rays, and in which the positive refractive effect becomes weak toward the periphery of the effective aperture. The values of coefficients at the aspherical surface are indicated in Table 17.

Table 18 indicates a value of the focal length of the lens system as a whole f at a time of infinite focusing, a value of F number Fno, and a value of a half angle of view ω. Further, Table 18 indicates a value of photographing distance (m) and a value of magnification β at the time of infinite focusing and finite-distance focusing.

Upon focusing in the imaging lens 6, a surface interval D9 between the aperture stop STO and the second lens group G2 varies, and a surface interval D15 between the second lens group G2 and the third lens group G3 varies. Values of the surface intervals at the time of infinite focusing and the time of finite-distance focusing are indicated in Table 18.

TABLE 16

Example 6

| Lens Group | Surface No. | Ri | Di | Ndi | vdi |
|---|---|---|---|---|---|
| G1 | 1 | 55.990 | 6.043 | 1.618 | 63.40 |
|  | 2 | 142.925 | 0.500 |  |  |
|  | 3 | 62.329 | 5.610 | 1.497 | 81.61 |
|  | 4 | 231.481 | 0.300 |  |  |
|  | 5 | 44.762 | 5.614 | 1.593 | 68.62 |
|  | 6 | 72.031 | 2.584 |  |  |
|  | 7 | 190.813 | 2.400 | 1.620 | 36.30 |
|  | 8 | 30.035 | 11.110 |  |  |
|  | 9 (STO) | INF | D9 |  |  |
| G2 | 10 | −45.043 | 1.500 | 1.620 | 36.30 |
|  | 11 | 40.344 | 6.000 | 2.001 | 29.13 |
|  | 12 | −356.729 | 0.540 |  |  |
|  | 13 | 90.474 | 1.500 | 1.805 | 25.46 |
|  | 14 | 42.736 | 14.371 | 1.623 | 58.16 |
|  | 15 (Aspherical Surface) | −81.985 | D15 |  |  |
| G3 | 16 | 84.439 | 10.346 | 1.954 | 32.32 |
|  | 17 | −35.444 | 3.500 | 1.755 | 27.53 |
|  | 18 | 70.580 | 9.878 |  |  |
|  | 19 | −28.571 | 1.600 | 2.001 | 29.13 |
|  | 20 | −40.000 |  |  |  |

TABLE 17

Example 6 • Aspherical Surface Coefficient

| Surface No. | Order | Coefficient |
|---|---|---|
| 15 (Aspherical Surface) | K | 0.00000E+00 |
|  | A4 | 2.61875E−06 |
|  | A6 | 9.42776E−10 |
|  | A8 | −2.24855E−14 |

TABLE 18

Example 6

|  | At time of Infinite Focusing | At time of Finite-Distance Focusing |
|---|---|---|
| Fno | 1.45 | — |
| f | 82.45 | — |
| ω | 14.70 | — |
| Photographing Distance (m) | INF | 0.85 |
| β | 0.000 | 0.115 |
| D9 | 21.599 | 7.149 |
| D15 | 3.645 | 18.095 |

FIG. 12 illustrates a longitudinal aberration in a state of infinite focusing (upper row) and a longitudinal aberration in a state of close-distance focusing (photographing distance being 0.85 m) (lower row) in Numerical Example 6.

As can be appreciated from each of the aberration diagrams, in the imaging lens 6 according to Numerical Example 6, the aberrations are each favorably corrected in the state of infinite focusing and in the state of close-distance focusing, and thus it is clear that the imaging lens 6 according to Numerical Example 6 has small performance variation upon focusing and thus a superior image-forming performance.

Numerical Example 7

Table 19 indicates lens data of Numerical Example 7 in which specific numerical values are applied to the imaging lens 7 illustrated in FIG. 13.

In the imaging lens 7 according to Numerical Example 7, the first lens group G1 includes, in order from the object side toward the image plane side, three positive lenses each allowing a convex surface thereof to face the object side and a negative lens allowing a concave surface thereof to face the image plane side.

The second a-lens component G2*a* includes a cemented lens having, in order from the object side toward the image plane side, a negative lens and a positive lens. The second b-lens component G2*b* includes a cemented lens having, in order from the object side toward the image plane side, a negative lens and a positive lens.

The third lens group G3 has negative refractive power. The third a-lens component G3*a* includes a cemented lens having, in order from the object side toward the image plane side, a positive lens and a negative lens. The third b-lens component G3*b* includes a single negative lens.

The imaging lens 7 has an aspherical surface formed on a surface positioned closest to the object side, of the second b-lens component G2*b* (the 13th surface). This aspherical surface has an aspherical shape that has a positive refractive effect with respect to an on-axis bundle of rays, and in which the positive refractive effect becomes weak toward the periphery of the effective aperture. The values of coefficients at the aspherical surface are indicated in Table 20.

Table 21 indicates a value of the focal length of the lens system as a whole f at a time of infinite focusing, a value of F number Fno, and a value of a half angle of view ω. Further, Table 21 indicates a value of photographing distance (m) and a value of magnification β at the time of infinite focusing and finite-distance focusing.

Upon focusing in the imaging lens 7, a surface interval D9 between the aperture stop STO and the second lens group G2 varies, and a surface interval D15 between the second lens group G2 and the third lens group G3 varies. Values of the surface intervals at the time of infinite focusing and the time of finite-distance focusing are indicated in Table 21.

TABLE 19

Example 7

| Lens Group | Surface No. | Ri | Di | Ndi | vdi |
|---|---|---|---|---|---|
| G1 | 1 | 58.920 | 11.044 | 1.618 | 63.40 |
|  | 2 | 144.961 | 0.500 |  |  |
|  | 3 | 54.020 | 9.505 | 1.497 | 81.61 |
|  | 4 | 133.099 | 0.300 |  |  |
|  | 5 | 38.834 | 7.281 | 1.593 | 68.62 |
|  | 6 | 67.289 | 3.200 |  |  |
|  | 7 | 115.240 | 2.400 | 1.648 | 33.84 |

TABLE 19-continued

Example 7

| Lens Group | Surface No. | Ri | Di | Ndi | vdi |
|---|---|---|---|---|---|
|  | 8 | 26.438 | 12.000 |  |  |
|  | 9 (STO) | INF | D9 |  |  |
| G2 | 10 | −52.502 | 1.500 | 1.648 | 33.84 |
|  | 11 | 20.654 | 6.000 | 1.834 | 37.35 |
|  | 12 | 39.429 | 0.540 |  |  |
|  | 13 (Aspherical Surface) | 34.062 | 1.500 | 1.834 | 37.29 |
|  | 14 | 29.105 | 8.712 | 1.648 | 33.84 |
|  | 15 | −46.007 | D15 |  |  |
| G3 | 16 | 95.454 | 3.665 | 1.806 | 33.27 |
|  | 17 | −96.977 | 1.500 | 1.702 | 41.15 |
|  | 18 | 84.911 | 4.000 |  |  |
|  | 19 | −80.571 | 1.600 | 1.702 | 41.15 |
|  | 20 | −311.184 |  |  |  |

TABLE 20

Example 7 • Aspherical Surface Coefficient

| Surface No. | Order | Coefficient |
|---|---|---|
| 13 (Aspherical Surface) | K | 0.00000+00 |
|  | A4 | −6.33581E−06 |
|  | A6 | −1.20370E−09 |
|  | A8 | −4.40294E−12 |

TABLE 21

Example 7

|  | At time of Infinite Focusing | At time of Finite-Distance Focusing |
|---|---|---|
| Fno | 1.85 | — |
| f | 131.00 | — |
| ω | 9.38 | — |
| Photographing Distance (m) | INF | 0.85 |
| β | 0.000 | 0.169 |
| D9 | 34.430 | 4.372 |
| D15 | 3.000 | 33.059 |

FIG. 14 illustrates a longitudinal aberration in a state of infinite focusing (upper row) and a longitudinal aberration in a state of close-distance focusing (photographing distance being 0.85 m) (lower row) in Numerical Example 7.

As can be appreciated from each of the aberration diagrams, in the imaging lens 7 according to Numerical Example 7, the aberrations are each favorably corrected in the state of infinite focusing and in the state of close-distance focusing, and thus it is clear that the imaging lens 7 according to Numerical Example 7 has small performance variation upon focusing and thus a superior image-forming performance.

Numerical Example 8

Table 22 indicates lens data of Numerical Example 8 in which specific numerical values are applied to the imaging lens 8 illustrated in FIG. 15.

In the imaging lens 8 according to Numerical Example 8, the first lens group G1 includes, in order from the object side toward the image plane side, three positive lenses each allowing a convex surface thereof to face the object side and a negative lens allowing a concave surface thereof to face the image plane side.

The second a-lens component G2a includes a cemented lens having, in order from the object side toward the image plane side, a negative lens and a positive lens. The second b-lens component G2b includes a cemented lens having, in order from the object side toward the image plane side, a negative lens and a positive lens.

The third lens group G3 has positive refractive power. The third a-lens component G3a includes a cemented lens having, in order from the object side toward the image plane side, a positive lens and a negative lens. The third b-lens component G3b includes a single negative lens.

The imaging lens 8 has an aspherical surface formed on a surface positioned closest to the object side, of the second b-lens component G2b (the 13th surface). This aspherical surface has an aspherical shape that has a positive refractive effect with respect to an on-axis bundle of rays, and in which the positive refractive effect becomes weak toward the periphery of the effective aperture. The values of coefficients at the aspherical surface are indicated in Table 23.

Table 24 indicates a value of the focal length of the lens system as a whole f at a time of infinite focusing, a value of F number Fno, and a value of a half angle of view ω. Further, Table 24 indicates a value of photographing distance (m) and a value of magnification β at the time of infinite focusing and finite-distance focusing.

Upon focusing in the imaging lens 8, a surface interval D9 between the aperture stop STO and the second lens group G2 varies, and a surface interval D15 between the second lens group G2 and the third lens group G3 varies. Values of the surface intervals at the time of infinite focusing and the time of finite-distance focusing are indicated in Table 24.

TABLE 22

Example 8

| Lens Group | Surface No. | Ri | Di | Ndi | vdi |
|---|---|---|---|---|---|
| G1 | 1 | 67.172 | 6.905 | 1.618 | 63.40 |
|  | 2 | 329.642 | 0.500 |  |  |
|  | 3 | 63.821 | 4.000 | 1.497 | 81.61 |
|  | 4 | 102.336 | 0.300 |  |  |
|  | 5 | 49.428 | 6.064 | 1.593 | 68.62 |
|  | 6 | 105.836 | 2.300 |  |  |
|  | 7 | 219.318 | 2.400 | 1.620 | 36.30 |
|  | 8 | 36.429 | 11.110 |  |  |
|  | 9 (STO) | INF | D9 |  |  |
| G2 | 10 | −39.992 | 1.500 | 1.603 | 38.01 |
|  | 11 | 32.509 | 10.138 | 2.001 | 29.13 |
|  | 12 | −610.213 | 0.540 |  |  |
|  | 13 (Aspherical Surface) | 239.956 | 1.500 | 1.821 | 24.06 |
|  | 14 | 45.596 | 5.791 | 1.593 | 68.62 |
|  | 15 | −47.169 | D15 |  |  |
| G3 | 16 | 67.782 | 13.517 | 2.001 | 29.13 |
|  | 17 | −39.233 | 2.837 | 1.741 | 27.76 |
|  | 18 | 54.509 | 7.291 |  |  |
|  | 19 | −30.000 | 1.600 | 1.847 | 23.78 |
|  | 20 | −47.000 |  |  |  |

TABLE 23

Example 8 • Aspherical Surface Coefficient

| Surface No. | Order | Coefficient |
|---|---|---|
| 13 (Aspherical Surface) | K | 0.00000+00 |
|  | A4 | −3.79322E−06 |
|  | A6 | −2.31560E−09 |
|  | A8 | 2.00737E−12 |

TABLE 24

Example 8

| | At time of Infinite Focusing | At time of Finite-Distance Focusing |
|---|---|---|
| Fno | 1.45 | — |
| f | 72.00 | — |
| ω | 16.72 | — |
| Photographing Distance (m) | INF | 0.85 |
| β | 0.000 | 0.099 |
| D9 | 20.604 | 6.663 |
| D15 | 3.002 | 16.942 |

FIG. 16 illustrates a longitudinal aberration in a state of infinite focusing (upper row) and a longitudinal aberration in a state of close-distance focusing (photographing distance being 0.85 m) (lower row) in Numerical Example 8.

As can be appreciated from each of the aberration diagrams, in the imaging lens 8 according to Numerical Example 8, the aberrations are each favorably corrected in the state of infinite focusing and in the state of close-distance focusing, and thus it is clear that the imaging lens 8 according to Numerical Example 8 has small performance variation upon focusing and thus a superior image-forming performance.

Numerical Example 9

Table 25 indicates lens data of Numerical Example 9 in which specific numerical values are applied to the imaging lens 9 illustrated in FIG. 17.

In the imaging lens 9 according to Numerical Example 9, the first lens group G1 includes, in order from the object side toward the image plane side, three positive lenses each allowing a convex surface thereof to face the object side and a negative lens allowing a concave surface thereof to face the image plane side.

The second a-lens component G2a includes a cemented lens having, in order from the object side toward the image plane side, a negative lens and a positive lens.

The second b-lens component G2b includes, in order from the object side toward the image plane side, the second b1-lens component G2b1 and the second b2-lens component G2b2. The second b1-lens component G2b1 includes a cemented lens having, in order from the object side toward the image plane side, a positive lens and a negative lens. The second b2-lens component G2b2 includes a single positive lens.

The third lens group G3 has negative refractive power. The third a-lens component G3a includes a cemented lens having, in order from the object side toward the image plane side, a positive lens and a negative lens. The third b-lens component G3b includes a single negative lens.

The imaging lens 9 has an aspherical surface formed on a surface positioned closest to the object side, of the second b-lens component G2b (the 17th surface). The values of coefficients at the aspherical surface are indicated in Table 26.

Table 27 indicates a value of the focal length of the lens system as a whole f at a time of infinite focusing, a value of F number Fno, and a value of a half angle of view ω. Further, Table 27 indicates a value of photographing distance (m) and a value of magnification β at the time of infinite focusing and finite-distance focusing.

Upon focusing in the imaging lens 9, a surface interval D9 between the aperture stop STO and the second lens group G2 varies, and a surface interval D 17 between the second lens group G2 and the third lens group G3 varies. Values of the surface intervals at the time of infinite focusing and the time of finite-distance focusing are indicated in Table 27.

TABLE 25

Example 9

| Lens Group | Surface No. | Ri | Di | Ndi | νdi |
|---|---|---|---|---|---|
| G1 | 1 | 51.831 | 11.387 | 1.487 | 70.44 |
| | 2 | 505.254 | 0.300 | | |
| | 3 | 46.304 | 4.526 | 1.497 | 81.61 |
| | 4 | 66.724 | 0.300 | | |
| | 5 | 42.431 | 4.000 | 1.729 | 54.67 |
| | 6 | 52.099 | 3.524 | | |
| | 7 | 124.003 | 2.400 | 1.723 | 37.99 |
| | 8 | 33.670 | 11.149 | | |
| | 9 (STO) | INF | D9 | | |
| G2 | 10 | −50.703 | 1.500 | 1.699 | 30.05 |
| | 11 | 54.646 | 8.500 | 2.001 | 29.13 |
| | 12 | −250.000 | 1.000 | | |
| | 13 | 38.051 | 9.506 | 1.804 | 46.50 |
| | 14 | −58.846 | 1.700 | 1.648 | 33.84 |
| | 15 | 38.309 | 5.000 | | |
| | 16 | 69.306 | 2.300 | 1.882 | 37.22 |
| | 17 (Aspherical Surface) | 282.027 | D17 | | |
| G3 | 18 | 167.428 | 3.721 | 1.911 | 35.25 |
| | 19 | −84.587 | 1.500 | 1.620 | 36.30 |
| | 20 | 98.772 | 9.260 | | |
| | 21 | −56.827 | 1.600 | 1.785 | 25.72 |
| | 22 | −83.366 | | | |

TABLE 26

Example 9 • Aspherical Surface Coefficient

| Surface No. | Order | Coefficient |
|---|---|---|
| 17 (Aspherical Surface) | K | 0.00000E+00 |
| | A4 | 4.39151E−06 |
| | A6 | 3.11117E−09 |
| | A8 | 2.85237E−12 |

TABLE 27

Example 9

| | At time of Infinite Focusing | At time of Finite-Distance Focusing |
|---|---|---|
| Fno | 1.44 | — |
| f | 82.45 | — |
| ω | 14.70 | — |
| Photographing Distance (m) | INF | 0.85 |
| β | 0.000 | 0.115 |
| D9 | 16.866 | 6.565 |
| D17 | 5.190 | 15.490 |

FIG. 18 illustrates a longitudinal aberration in a state of infinite focusing (upper row) and a longitudinal aberration in a state of close-distance focusing (photographing distance being 0.85 m) (lower row) in Numerical Example 9.

As can be appreciated from each of the aberration diagrams, in the imaging lens 9 according to Numerical Example 9, the aberrations are each favorably corrected in the state of infinite focusing and in the state of close-distance focusing, and thus it is clear that the imaging lens 9 according to Numerical Example 9 has small performance variation upon focusing and thus a superior image-forming performance.
[Other Numerical Data of Each Numerical Example]
Table 28 indicates summarized values of the above-described conditional expressions for each of the numerical examples.

TABLE 28

| Conditional Expressions | Examples | | | | | | | | |
|---|---|---|---|---|---|---|---|---|---|
| | 1 | 2 | 3 | 4 | 5 | 6 | 7 | 8 | 9 |
| (1) f3b/f3a | −0.77 | −0.39 | −0.40 | −0.27 | −0.78 | −0.74 | −0.19 | −0.92 | −0.63 |
| (2) (r1 + r2)/(r1 − r2) | −1.75 | −1.47 | −0.09 | −0.60 | −0.70 | −6.00 | −1.70 | −4.53 | −5.28 |
| (3) f2b/f2 | 1.01 | 0.93 | 0.75 | 0.91 | 0.54 | 0.92 | 0.29 | 0.94 | 1.55 |
| (4) f1/f3 | −0.19 | −0.76 | −0.55 | −0.66 | −0.26 | −0.22 | −0.91 | 0.17 | −0.32 |
| (5) f2a/f2 | −30.55 | −12.59 | −1.33 | −6.52 | −0.96 | −8.27 | −0.36 | −10.40 | −3.44 |
| (6) f2b2/f2b1 | — | — | 4.17 | — | — | — | — | — | 0.92 |
| (7) f2b/f2a | −0.03 | −0.07 | −0.56 | −0.14 | −0.56 | −0.11 | −0.81 | −0.09 | −0.45 |
| (8) r_2a/f | −0.47 | −0.66 | −0.55 | −0.51 | −0.53 | −0.55 | −0.40 | −0.56 | −0.61 |

<5. Other Embodiments>

A technique of the disclosure is not limited to descriptions of the above-described embodiments and examples, and may be modified in a variety of ways. For example, shapes and numerical values of respective components illustrated in each of the above-described numerical examples are merely illustrative for specifying and carrying out the technology, and should not be used to construe the technical scope of the technology in a limitative manner.

Further, although description has been given, in the above-described embodiments and examples, of the configuration substantially including three lens groups, a configuration further including a lens not substantially having refractive power may be adopted.

Further, for example, the technology may have the following configurations.

[1]

An imaging lens including: in order from object side toward image plane side, a first lens group having positive refractive power; a second lens group having a positive refractive power; and a third lens group having positive or negative refractive power, the first lens group being fixed with respect to an image plane, the second lens group traveling along an optical axis to the object side, and the third lens group being fixed with respect to the image plane, upon focusing from an object at infinite to an object at a short distance, the first lens group including, in order from the object side toward the image plane side, at least two positive lenses and a negative lens that is disposed closest to the image plane side in the first lens group, the second lens group including, in order from the object side toward the image plane side, a second a-lens component having negative refractive power and a second b-lens component having positive refractive power, and the third lens group including, in order from the object side toward the image plane side, a third a-lens component having positive refractive power and a third b-lens component having negative refractive power.

[2]

The imaging lens according to [1], in which a following conditional expression is satisfied:

$$-1.6 < f3b/f3a < 0 \quad (1)$$

where a focal length of the third a-lens component is f3a, and a focal length of the third b-lens component is f3b.

[3]

The imaging lens according to [1] or [2], in which the third b-lens component includes a single negative lens, and
a following conditional expression is satisfied:

$$-10 < (r1+r2)/(r1-r2) < 0.0 \quad (2)$$

where a radius of curvature of the third b-lens component on the object side is r1, and a radius of curvature of the third b-lens group on the image plane side is r2.

[4]

The imaging lens according to any one of [1] to [3], in which
the second b-lens component includes a cemented lens having, in order from the object side toward the image plane side, a negative lens and a positive lens, and
a following conditional expression is satisfied:

$$0 < f2b/f2 < 1.6 \quad (3)$$

where a focal length of the second lens group is f2, and a focal length of the second b-lens component is f2b.

[5]

The imaging lens according to any one of [1] to [4], in which the third a-lens component includes a cemented lens having, in order from the object side toward the image plane side, a positive lens and a negative lens.

[6]

The imaging lens according to any one of [1] to [5], in which the second lens group has an aspherical shape that has a positive refractive effect with respect to an on-axis bundle of rays and in which the positive refractive effect becomes weak toward a periphery of an effective aperture.

[7]

The imaging lens according to any one of [1] to [6], in which a following conditional expression is satisfied:

$$-1.5 < f1/f3 < 0.5 \quad (4)$$

where a focal length of the first lens group is f1, and a focal length of the third lens group is f3.

[8]

The imaging lens according to any one of [1] to [7], in which
the second a-lens component includes a cemented lens having, in order from the object side toward the image plane side, a negative lens and a positive lens, and
a following conditional expression is satisfied:

$$-35 < f2a/f2 < -4 \quad (5)$$

where a focal length of the second lens group is f2, and a focal length of the second a-lens component is f2a.

[9]

The imaging lens according to any one of [1] to [3] and [5] to [8], in which the second b-lens component includes, in order from the object side toward the image plane side, a second b1-lens component and a second b2-lens component, and a following conditional expression is satisfied:

$$0<f2b2/f2b1<5 \tag{6}$$

where a focal length of the second b1-lens component is f2b1, and a focal length of the second b2-lens component is f2b2.

[10]

The imaging lens according to any one of [1] to [9], in which a following conditional expression is satisfied:

$$-1.5<f2b/f2a<0.0 \tag{7}$$

where a focal length of the second a-lens component is f2a, and a focal length of the second b-lens component is f2b.

[11]

The imaging lens according to any one of [1] to [10], in which a lens surface positioned closest to the object side, of the second lens group has a concave shape on the object side.

[12]

The imaging lens according to any one of [1] to [11], in which a following conditional expression is satisfied:

$$-1<r\_2a/f<-0.1 \tag{8}$$

where a radius of curvature of a surface positioned closest to the object side, of the second a-lens component is r_2a, and a focal length of a system as a whole is f.

[13]

The imaging lens according to any one of [1] to [12], further including a lens substantially not having refractive power.

[14]

An imaging apparatus with an imaging lens and an imaging device that outputs an imaging signal corresponding to an optical image formed by the imaging lens, in which the imaging lens includes:

in order from object side toward image plane side, a first lens group having positive refractive power; a second lens group having a positive refractive power; and a third lens group having positive or negative refractive power;

the first lens group being fixed with respect to an image plane, the second lens group traveling along an optical axis to the object side, and the third lens group being fixed with respect to the image plane, upon focusing from an object at infinite to an object at a short distance;

the first lens group including, in order from the object side toward the image plane side, at least two positive lenses and a negative lens that is disposed closest to the image plane side in the first lens group;

the second lens group including, in order from the object side toward the image plane side, a second a-lens component having negative refractive power and a second b-lens component having positive refractive power; and the third lens group including, in order from the object side toward the image plane side, a third a-lens component having positive refractive power and a third b-lens component having negative refractive power.

[15]

The imaging apparatus according to [14], in which the imaging apparatus further includes a lens substantially not having refractive power.

This application claims the benefit of Japanese Priority Patent Application JP2016-012401 filed with the Japan Patent Office on Jan. 26, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging lens comprising: in order from object side toward image plane side, a first lens group having positive refractive power; a second lens group having a positive refractive power; and a third lens group having positive or negative refractive power, the first lens group being fixed with respect to an image plane, the second lens group traveling along an optical axis to the object side, and the third lens group being fixed with respect to the image plane, upon focusing from an object at infinity to an object at a short distance, the first lens group including, in order from the object side toward the image plane side, at least two positive lenses that are disposed closest to the object side in the first lens group and a negative lens that is disposed closest to the image plane side in the first lens group, the second lens group including, in order from the object side toward the image plane side, a second a-lens component having negative refractive power and a second b-lens component having positive refractive power, and the third lens group including, in order from the object side toward the image plane side, a third a-lens component having positive refractive power and a third b-lens component having negative refractive power, a following conditional expression is satisfied:

$$-1.5<f1/f3<0.2 \tag{4A}$$

where a focal length of the first lens group is f1, and a focal length of the third lens group is f3.

2. The imaging lens according to claim 1, wherein the third b-lens component includes a single negative lens, and a following conditional expression is satisfied:

$$-10<(r1+r2)/(r1-r2)<0.0 \tag{2}$$

where a radius of curvature of the third b-lens component on the object side is r1, and a radius of curvature of the third b-lens group on the image plane side is r2.

3. The imaging lens according to claim 1, wherein the second b-lens component includes a cemented lens having, in order from the object side toward the image plane side, a negative lens and a positive lens, and a following conditional expression is satisfied:

$$0<f2b/f2<1.6 \tag{3}$$

where a focal length of the second lens group is f2, and a focal length of the second b-lens component is f2b.

4. The imaging lens according to claim 1, wherein the third a-lens component includes a cemented lens having, in order from the object side toward the image plane side, a positive lens and a negative lens.

5. The imaging lens according to claim 1, wherein the second lens group has an aspherical shape that has a positive refractive effect with respect to an on-axis bundle of rays and in which the positive refractive effect becomes weak toward a periphery of an effective aperture.

6. The imaging lens according to claim 1, wherein the second a-lens component includes a cemented lens having, in order from the object side toward the image plane side, a negative lens and a positive lens, and a following conditional expression is satisfied:

$$-35 < f2a/f2 < -4 \qquad (5)$$

where a focal length of the second lens group is f2, and a focal length of the second a-lens component is f2a.

7. The imaging lens according to claim 1, wherein
the second b-lens component includes, in order from the object side toward the image plane side,
the second b-lens component includes, in order from the object side toward the image plane side, a second b1-lens component and a second b2-lens component, and
a following conditional expression is satisfied:

$$0 < f2b2/f2b1 < 5 \qquad (6)$$

where a focal length of the second b1-lens component is f2b1, and a focal length of the second b2-lens component is f2b2.

8. The imaging lens according to claim 1, wherein a following conditional expression is satisfied:

$$-1.5 < f2b/f2a < 0.0 \qquad (7)$$

where a focal length of the second a-lens component is f2a, and a focal length of the second b-lens component is f2b.

9. The imaging lens according to claim 1, wherein a following conditional expression is satisfied:

$$-1 < r\_2a/f < -0.1 \qquad (8)$$

where a radius of curvature of a surface positioned closest to the object side, of the second a-lens component is r_2a, and a focal length of a system as a whole is f.

10. The imaging lens according to claim 1, wherein a lens surface positioned closest to the object side of the second lens group has a concave shape on the object side.

11. An imaging lens comprising: in order from object side toward image plane side, a first lens group having positive refractive power; a second lens group having a positive refractive power; and a third lens group having positive or negative refractive power,
the first lens group being fixed with respect to an image plane, the second lens group traveling along an optical axis to the object side, and the third lens group being fixed with respect to the image plane, upon focusing from an object at infinity to an object at a short distance,
the first lens group including, in order from the object side toward the image plane side, at least two positive lenses and a negative lens that is disposed closest to the image plane side in the first lens group,
the second lens group including, in order from the object side toward the image plane side, a second a-lens component having negative refractive power and a second b-lens component having positive refractive power, and
the third lens group including, in order from the object side toward the image plane side, a third a-lens component having positive refractive power and a third b-lens component having negative refractive power,
a following conditional expression is satisfied:

$$-1.5 < f1/f3 < 0.2 \qquad (4A)$$

where a focal length of the first lens group is f1, and a focal length of the third lens group is f3, and wherein a following conditional expression is satisfied:

$$-1.6 < f3b/f3a < 0 \qquad (1)$$

where a focal length of the third a-lens component is f3a, and a focal length of the third b-lens component is f3b.

12. An imaging apparatus with an imaging lens and an imaging device that outputs an imaging signal corresponding to an optical image formed by the imaging lens, the imaging lens comprising:
in order from object side toward image plane side, a first lens group having positive refractive power; a second lens group having a positive refractive power; and a third lens group having positive or negative refractive power;
the first lens group being fixed with respect to an image plane, the second lens group traveling along an optical axis to the object side, and the third lens group being fixed with respect to the image plane, upon focusing from an object at infinity to an object at a short distance;
the first lens group including, in order from the object side toward the image plane side, at least two positive lenses that are disposed closest to the object side in the first lens group and a negative lens that is disposed closest to the image plane side in the first lens group;
the second lens group including, in order from the object side toward the image plane side, a second a-lens component having negative refractive power and a second b-lens component having positive refractive power; and
the third lens group including, in order from the object side toward the image plane side, a third a-lens component having positive refractive power and a third b-lens component having negative refractive power,
a following conditional expression is satisfied:

$$-1.5 < f1/f3 < 0.2 \qquad (4A)$$

where a focal length of the first lens group is f1, and a focal length of the third lens group is f3.

13. The imaging apparatus according to claim 12, wherein a following conditional expression is satisfied:

$$-1.6 < f3b/f3a < 0 \qquad (1)$$

where a focal length of the third a-lens component is f3a, and a focal length of the third b-lens component is f3b.

14. The imaging apparatus according to claim 12, wherein the third b-lens component includes a single negative lens, and
a following conditional expression is satisfied:

$$-10 < (r1+r2)/(r1-r2) < 0.0 \qquad (2)$$

where a radius of curvature of the third b-lens component on the object side is r1, and a radius of curvature of the third b-lens group on the image plane side is r2.

15. The imaging apparatus according to claim 12, wherein the second b-lens component includes a cemented lens having, in order from the object side toward the image plane side, a negative lens and a positive lens, and
a following conditional expression is satisfied:

$$0 < f2b/f2 < 1.6 \qquad (3)$$

where a focal length of the second lens group is f2, and a focal length of the second b-lens component is f2b.

16. The imaging apparatus according to claim 12, wherein the third a-lens component includes a cemented lens having, in order from the object side toward the image plane side, a positive lens and a negative lens.

17. The imaging apparatus according to claim 12, wherein the second lens group has an aspherical shape that has a positive refractive effect with respect to an on-axis bundle of rays and in which the positive refractive effect becomes weak toward a periphery of an effective aperture.

18. The imaging apparatus according to claim 12, wherein the second a-lens component includes a cemented lens having, in order from the object side toward the image plane side, a negative lens and a positive lens, and a following conditional expression is satisfied:

$$-35 < f2a/f2 < -4 \tag{5}$$

where a focal length of the second lens group is f2, and a focal length of the second a-lens component is f2a.

19. The imaging apparatus according to claim 12, wherein the second b-lens component includes, in order from the object side toward the image plane side, the second b-lens component includes, in order from the object side toward the image plane side, a second b1-lens component and a second b2-lens component, and a following conditional expression is satisfied:

$$0 < f2b2/f2b1 < 5 \tag{6}$$

where a focal length of the second b1-lens component is f2b1, and a focal length of the second b2-lens component is f2b2.

20. The imaging apparatus according to claim 12, wherein a following conditional expression is satisfied:

$$-1.5 < f2b/f2a < 0.0 \tag{7}$$

where a focal length of the second a-lens component is f2a, and a focal length of the second b-lens component is f2b.

* * * * *